US010204479B2

(12) United States Patent
LaRocca et al.

(10) Patent No.: US 10,204,479 B2
(45) Date of Patent: Feb. 12, 2019

(54) SYSTEM, METHOD, AND NON-TRANSITORY COMPUTER-READABLE STORAGE MEDIA FOR MULTIPLE EXCHANGE OF MULTIPLE ITERATIONS OF THE SAME ONLINE WAGER TRANSACTION

(71) Applicant: Get Out Ahead LLC, Detroit, MI (US)

(72) Inventors: Dominic J. LaRocca, Fort Lauderdale, FL (US); Daniel Mark Tuckett, Boynton Beach, FL (US); Joshua Tyler Pearl, Ballwin, MO (US); Zachary Lax, Brighton, MA (US)

(73) Assignee: Get Out Ahead LLC, Detroit, MI (US)

( * ) Notice: Subject to any disclaimer, the term of this patent is extended or adjusted under 35 U.S.C. 154(b) by 0 days.

(21) Appl. No.: 15/873,543

(22) Filed: Jan. 17, 2018

(65) Prior Publication Data

US 2018/0211479 A1 Jul. 26, 2018

Related U.S. Application Data

(63) Continuation of application No. 15/047,529, filed on Feb. 18, 2016, now Pat. No. 9,911,270.

(Continued)

(51) Int. Cl.
*G06F 17/00* (2006.01)
*G07F 17/32* (2006.01)

(52) U.S. Cl.
CPC ...... *G07F 17/3225* (2013.01); *G07F 17/3244* (2013.01)

(58) Field of Classification Search
None
See application file for complete search history.

(56) References Cited

U.S. PATENT DOCUMENTS 5,978,776 A 11/1999 Seretti et al.
6,023,685 A 2/2000 Brett et al.

(Continued)

FOREIGN PATENT DOCUMENTS

WO 2007/013470 A1 2/2007

OTHER PUBLICATIONS

Sareen, Himanshu, How Apps Overthrew Web Development and Changed the Internet, Wired.com, [online], Jun. 2014, available at: <https://www.wired.com/insights/2014/06/apps-overthrew-web-development-changed-internet/> (Year: 2014).

(Continued)

*Primary Examiner* — Paul A D'Agostino
(74) *Attorney, Agent, or Firm* — Howard & Howard Attorneys PLLC

(57) ABSTRACT

A system, method and computer product for multiple online exchanges of multiple iterations of all or part of a wager or fantasy sports entry is disclosed. A user accesses a wager exchange website. The user creates a user account and selects a ticket for partial sale. The user indicates a percentage value of the ticket that the user wishes to sell. The ticket is split into two child tickets, a first child ticket corresponding to the percentage value the user wishes to sell and a second child ticket corresponding to a percentage value the user wishes to retain. The ticket is set as inactive, and the first child ticket is set as active. The first child ticket is offered for sale on the exchange website. A second user purchases the first child ticket, and the process repeats with the first child ticket.

25 Claims, 25 Drawing Sheets

Related U.S. Application Data

(60) Provisional application No. 62/222,120, filed on Sep. 22, 2015, provisional application No. 62/170,535, filed on Jun. 3, 2015.

(56) References Cited

U.S. PATENT DOCUMENTS

| | | | | |
|---|---|---|---|---|
| 8,475,267 | B1 * | 7/2013 | Brook | G07F 17/3288 463/25 |
| 8,647,195 | B2 | 2/2014 | Brook et al. | |
| 2002/0147655 | A1 | 10/2002 | Say | |
| 2004/0220821 | A1 | 11/2004 | Ericsson et al. | |
| 2005/0233797 | A1 * | 10/2005 | Gilmore | G06Q 20/202 463/17 |
| 2006/0025208 | A1 | 2/2006 | Ramsey | |
| 2006/0052168 | A1 | 3/2006 | Shacham | |
| 2000/6017377 | | 8/2006 | Ettinger, Jr. | |
| 2006/0173773 | A1 | 8/2006 | Ettinger, Jr. | |
| 2008/0015005 | A1 * | 1/2008 | Yaldoo | A63F 3/064 463/16 |
| 2010/0203950 | A1 * | 8/2010 | Frick | G07F 17/32 463/22 |
| 2011/0021262 | A1 | 1/2011 | Wikander | |
| 2011/0065494 | A1 | 3/2011 | Kennedy et al. | |
| 2011/0258068 | A1 | 10/2011 | Asher et al. | |
| 2012/0022992 | A1 | 1/2012 | Odom et al. | |
| 2012/0034974 | A1 | 2/2012 | Amaitis et al. | |
| 2012/0278191 | A1 | 11/2012 | Aschettino et al. | |
| 2012/0315979 | A1 | 12/2012 | Eads | |
| 2013/0012303 | A1 | 1/2013 | Asher et al. | |
| 2013/0024323 | A1 | 1/2013 | Tomassen | |
| 2013/0079094 | A1 | 3/2013 | Odom et al. | |
| 2013/0151295 | A1 | 6/2013 | Denker et al. | |
| 2013/0218708 | A1 | 8/2013 | Finkelstein et al. | |
| 2014/0024435 | A1 * | 1/2014 | Scott | G07F 17/3223 463/25 |
| 2014/0106686 | A1 | 4/2014 | Brook et al. | |
| 2014/0106860 | A1 | 4/2014 | Brook et al. | |
| 2014/0274311 | A1 | 9/2014 | Aronowitz | |
| 2014/0342817 | A1 | 11/2014 | Marantelli | |
| 2015/0142598 | A1 | 5/2015 | Harris | |
| 2016/0328919 | A1 * | 11/2016 | Marantelli | G07F 17/3276 |

OTHER PUBLICATIONS

A Timeline of Database History [online] available at: <https://www.quickbase.com/articles/timeline-of-database-history>, also available from the "Wayback Machine" from Oct. 2, 2016, <https://web.archine.org/web/2016002191516//http://www.quickbase.com/articles/timeline-ofdatabase-history> (Year: 2016).

Non-Final Office Action (U.S. Appl. No. 15/047,536); dated: Aug. 10, 2018.

Non-Final Office Action (U.S. Appl. No. 15/047,558); dated: Aug. 10, 2018.

Non-Final Office Action (U.S. Appl. No. 15/047,509); dated: Sep. 6, 2018.

International Search Report and Written Opinion (International Application No. PCT/US2016/030430); dated: Aug. 5, 2016; 9 pages.

International Search Report and Written Opinion (International Application No. PCT/US2016/030433); dated: Aug. 5, 2016; 10 pages.

International Search Report and Written Opinion (International Application No. PCT/US2016/030438); dated: Aug. 8, 2016; 7 pages.

International Search Report and Written Opinion (International Application No. PCT/US2016/030439); dated: Aug. 11, 2016; 7 pages.

* cited by examiner

SYSTEM, METHOD, AND NON-TRANSITORY COMPUTER-READABLE STORAGE MEDIA FOR MULTIPLE EXCHANGE OF MULTIPLE ITERATIONS OF THE SAME ONLINE WAGER TRANSACTION

CROSS-REFERENCE TO RELATED APPLICATION

This application is a continuation of U.S. patent Ser. No. 15/047,529, filed Feb. 18, 2016, which claims the benefit of U.S. Provisional Patent Application Ser. No. 62/170,535, filed Jun. 3, 2015 and U.S. Provisional Patent Application Ser. No. 62/222,120, filed Sep. 22, 2015, the disclosures of which are hereby incorporated by reference in their entirety.

FIELD OF THE DISCLOSURE

The present invention relates to wagering, and more particularly, to systems, methods, and computer-readable storage media that allow the exchange of purchased wagers. The suggested class/subclass of the disclosure is: CLASS 707: DATA PROCESSING: DATABASE AND FILE MANAGEMENT OR DATA STRUCTURES and subclass 607: ONLINE TRANSACTIONAL PROCESSING (OLTP) SYSTEM. The suggested Art Unit is 2161.

BACKGROUND

In traditional race and sports betting, a customer purchases a ticket that includes one or more wagers on one or more races or sporting events. The price of the ticket depends on the current odds, which are typically set by the gaming establishment or service selling the ticket. The odds are typically dynamic and may change at any time before the sporting event or race occurs.

Although the customer could potentially sell the ticket to another customer, the gaming establishment would have no way of tracking the sale, which may or may not comply with legal requirements of the jurisdiction. If the ticket was purchased in person, the gaming establishment may not associate the ticket with a particular customer, so the customer in possession of the ticket at the time of redemption will be entitled to collect the winnings, even though the customer in possession may not be the original purchaser.

Moreover, if a private sale of the ticket does occur, the customer may sell the ticket for any price. The price may be based on the original purchase price or some arbitrary price determined by the customer.

Additionally, if a private sale of the ticket occurs, typically the customer's entire interest in the ticket is transferred to the buyer. Otherwise, if a fraction of the customer's interest in the ticket is sold, the two customers would have to rely on the "honor system" to split the winnings according to the agreement, as only one customer could present the ticket to collect the winnings. The gaming establishment has no control over distributing the winnings according to the private sale/agreement, in the event of a dispute.

The same challenges also exist in the context of fantasy sports wagering.

The present invention is aimed at one or more of the problems identified above.

SUMMARY OF THE INVENTION

In different embodiments of the present invention, systems, methods, and computer-readable storage media allow multiple online exchanges of multiple iterations of all or part of a wager or fantasy sports entry.

In one aspect of the present invention, a system including a database stored on a server, an exchange application associated with a wagering service and installed on a user device accessible to a user and including a user interface, and a processing device of the server. The processing device is in communication with the user interface. The processing device includes a hosting unit, a profile management unit, and a ticket management unit. The hosting unit prompts a user to access the exchange application. The profile management unit prompts the user to create a user account. The hosting unit prompts the user to choose a ticket from the user account to offer for partial sale and receives from the user a percentage value of the ticket that the user wishes to sell. A ticket management unit splits the ticket into two child tickets, a first child ticket corresponding to the percentage value the user wishes to sell and a second child ticket corresponding to a percentage value the user wishes to retain. The ticket management unit sets a status associated with the ticket as inactive, and offers the first child ticket for sale on the exchange website.

In another embodiment of the present invention, a computer-implemented method is provided. In a first step, a user is prompted to access, by a hosting unit, an exchange website associated with a wagering service. In a second step, the user is prompted to create, by a profile management unit, a user account. In a third step, the user indicates a percentage value of the ticket that the user wishes to sell. In a fourth step, the ticket is split into two child tickets, a first child ticket corresponding to the percentage value the user wishes to sell and a second child ticket corresponding to a percentage value the user wishes to retain. In a fifth step, the ticket is set as inactive. In a sixth step, the first child ticket is set as active. In a seventh step, the first child ticket is offered for sale on the exchange website.

In still another embodiment of the present invention, one or more non-transitory computer-readable storage media, having computer-executable instructions embodied thereon, wherein when executed by at least one processor, the computer-executable instructions cause the processor to operate as a system including a database stored on a server, an exchange application associated with a wagering service and installed on a user device accessible to a user and including a user interface, and a processing device of the server. The processing device is in communication with the user interface. The processing device includes a hosting unit, a profile management unit, and a ticket management unit. The hosting unit prompts a user to access the exchange application. The profile management unit prompts the user to create a user account. The hosting unit prompts the user to choose a ticket from the user account to offer for partial sale and receives from the user a percentage value of the ticket that the user wishes to sell. A ticket management unit splits the ticket into two child tickets, a first child ticket corresponding to the percentage value the user wishes to sell and a second child ticket corresponding to a percentage value the user wishes to retain. The ticket management unit sets a status associated with the ticket as inactive, and offers the first child ticket for sale on the exchange website.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Figure 1:
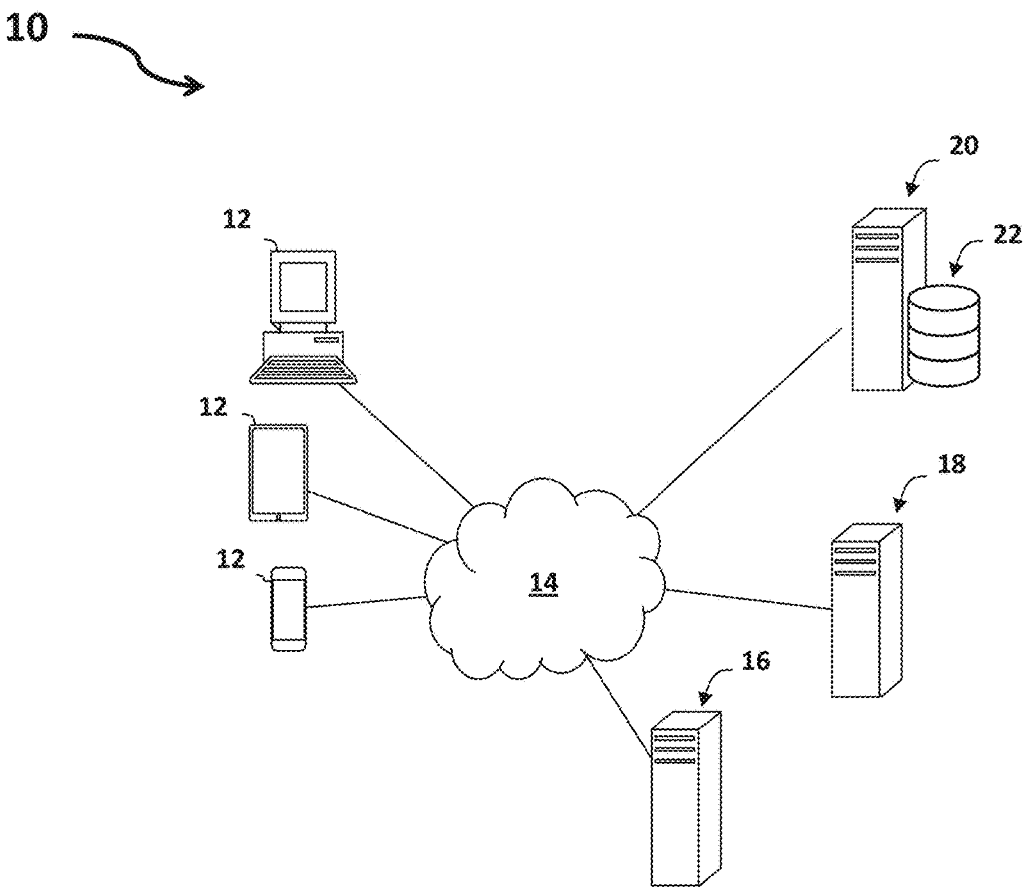
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

A wager (commonly known as a "bet") made with a licensed casino race and sports book is no different than a security, such as a stock, bond, or an "option". An option has set expiration dates, just as a wager has an expiration date (e.g., the end of the sporting event). As such, a wager has the potential to be continually traded until the designated point of expiration. A fantasy sports entry also has a finite timeframe, which allows for the selling all or part of an entry prior to completion of an event.

An exchange system that allows trading of all or part of a wager (or fantasy sports entry) offers wagering service providers (e.g., casinos, OTB providers, fantasy sports providers, etc.) an opportunity to obtain additional revenue from wagers already placed by collecting a commission on exchanged tickets. If users are able to liquidate part of their initial investments, users may reinvest their liquidated funds into additional wagers, resulting in more income for the wagering service. Additionally, providing a means for users to exchange wagers also allows the wagering service providers to track and audit each exchange.

Moreover, an exchange system offers users flexibility with their funds, as well as additional entertainment and interaction with their wagering activities. Users will not have to wait for an event to end (e.g., the end of a specific sporting game or the end of a sports season) to liquidate their investment or to further interact with the wagering service. Additionally, users may monitor their wagers and sell when it is most advantageous, which is financially beneficial and provides an added layer of strategy and entertainment.

Exchange System Architecture

With reference to the FIGS. and in operation, the present invention provides a wager exchange system 10, methods and computer product media to allow the exchange of purchased wagers. In general use, the system includes a processing device of a wagering service (e.g., a casino, off-track betting service, or fantasy sports software) that allows a user (e.g., a customer of the wagering service) to offer a wager for online purchase via a website or an application, i.e., "app", running on a user device. Referring to FIG. 1, an exemplary environment in which the system 10 operates is illustrated. In the illustrated embodiment, the system 10 is configured to enable a user to access a website with one or more user computing devices 12 to buy or sell wagers or fractions of wagers.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a hosting server 16, a gaming server 18, a database server 20, a database 22, and one or more user computing (or customer) devices 12 that are each coupled in communication via a communications network 14. The communications network 14 may be any suitable connection, including the Internet, file transfer protocol (FTP), an Intranet, LAN, a virtual private network (VPN), cellular networks, etc . . . , and may utilize any suitable or combination of technologies including, but not limited to wired and wireless connections, always on connections, connections made periodically, and connections made as needed.

The user computing device 12 may include any suitable device that enables a user to access and communicate with the system 10 including sending and/or receiving information to and from the system 10 and displaying information received from the system 10 to a user. For example, in one embodiment, the user computing device 12 may include, but is not limited to, a desktop computer, a laptop or notebook computer, a tablet computer, smartphone/tablet computer hybrid, a personal data assistant, a handheld mobile device including a cellular telephone, and the like. The user computing device 12 may be used to by a user, such as a customer, to exchange wagers with other users.

The hosting server 16 may be configured to host a website or provide data to the app that is accessible by a user via one or more user computing devices 12. For example, the hosting server 16 may retrieve and store a web page associated with one or more websites in response to requests received by the user via the user computing device 12 to allow users to interact with the website and exchange wagers via the website. In one embodiment, the hosting server 16 is configured to generate and display a web page associated with the website in response to requests being received from consumers via corresponding web browsers that are displayed on the user computing devices 12.

Figure 2:
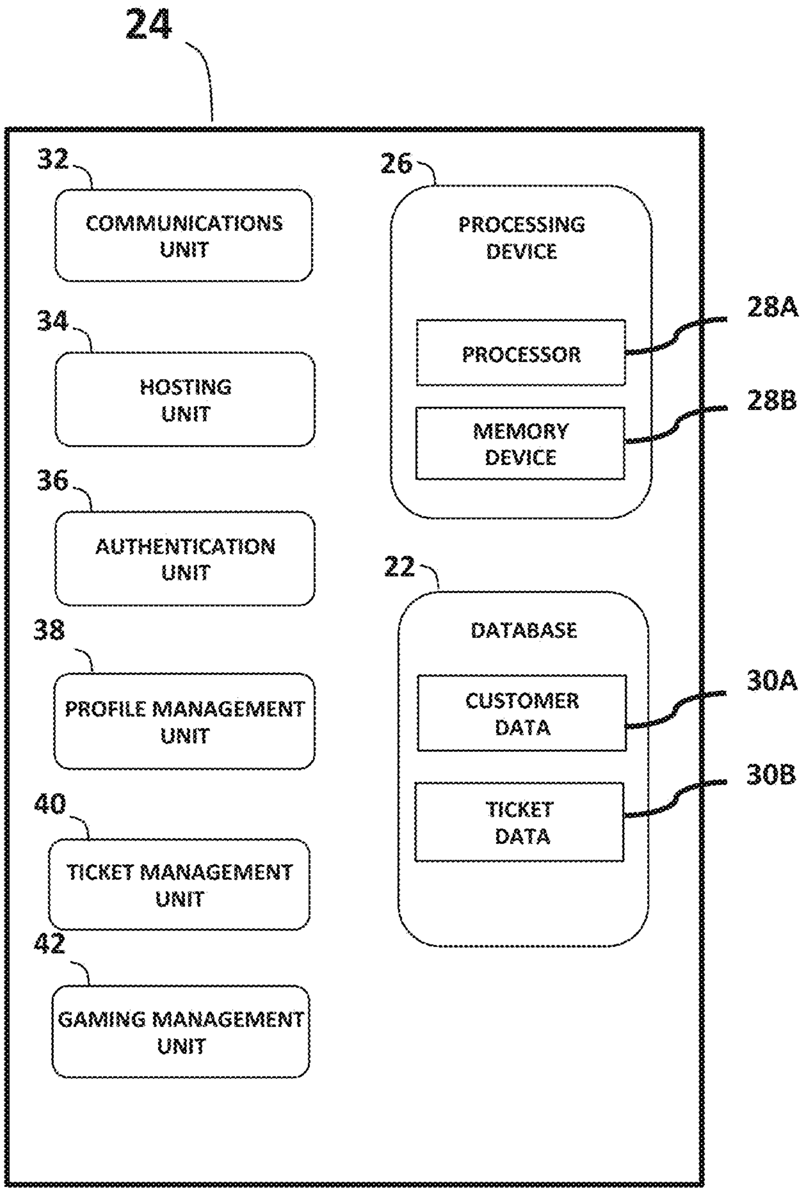
FIG. 2 is a schematic illustrating example components of a server, according to a first embodiment of the present invention.

Referring to FIG. 2, in one embodiment, the system 10 may include a system server 24 that is configured to perform the functions of the hosting server 16, the gaming server 18, and/or the database server 20. In the illustrated embodiment, the system server 24 includes a processing device 26 and the database 22.

The processing device 26 executes various programs, and thereby controls components of the system server 24 according to user instructions received from the user computing device 12. The processing device 26 may include a processor or processors 28A and a memory device 28B, e.g., read only memory (ROM) and random access memory (RAM), storing processor-executable instructions and one or more processors that execute the processor-executable instructions. In embodiments where the processing device 26 includes two or more processors 28A, the processors 28A can operate in a parallel or distributed manner. In an example, the processing device 26 may execute and/or implement a communications unit 32, a hosting unit 34, an authentication unit 36, a profile management unit 38, a ticket management unit 40, and a gaming management unit 42.

The database server 26 includes a memory device 28A that is connected to the database 22 to retrieve and store information contained in the database 22. The database 22 contains information on a variety of matters, such as, for example, customer account/profile information 30A, ticket information 30B (including odds information and pricing information), and/or any suitable information that enables the system 10 to function as described herein.

The memory device 28B may be configured to store programs and information in the database 22, and retrieve information from the database 22 that is used by the processor to perform various functions described herein. The memory device 28B may include, but is not limited to, a hard disc drive, an optical disc drive, and/or a flash memory drive. Further, the memory device may be distributed and located at multiple locations.

In one embodiment of the present invention, the memory device 28B may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

The communications unit 32 retrieves various data and information from the database 22 and sends information to the user computing device 12 via the communications network 14 to enable the user to access and interact with the system 10. In one embodiment, the communications unit 32 displays various images on a graphical interface of the user computing device 12 preferably by using computer graphics and image data stored in the database 22 including, but not limited to, web pages and/or any suitable information and/or images that enable the system 10 to function as described herein.

The hosting unit 34 may be programmed to perform some or all of the functions of the hosting server 16 including hosting various web pages associated with one or more websites that are stored in the database 22 and that are accessible to the user via the user computing device 12. The hosting unit 34 may be programmed to generate and display web pages associated with a website in response to requests being received from users via corresponding web browsers.

In one embodiment of the present invention, the authentication unit 36 may authenticate requests received from users via user computing device 12. The memory device 28B may retrieve information from the database 22 about the user to determine authentication.

The profile management unit 38 may maintain a plurality of profiles associated with users stored in database 22.

The ticket management unit 40 may be programmed to maintain all open wagers and facilitate the exchange of wagers between users.

The gaming management unit 42 may be programmed to customize the system 10 based on preferences of the wagering service and generate reports for the wagering service based on the activity of the system 10.

The communications unit 32 may further send information about wager exchanges to the user, such as by e-mail, text message, or push notification.

Electronic Ticket Exchange

In order to utilize the exchange system described herein, a user may be required to purchase a physical ticket from a wagering service (e.g., a casino, sports book, OTB location, etc.) that utilizes the exchange system described herein. The user must convert the physical ticket into an electronic ticket, which may be accomplished at the wagering service location. Employees of the wagering service may be required to manually validate the ticket. Any method of converting a physical ticket into an electronic ticket known in the art may be utilized.

Figure 3:
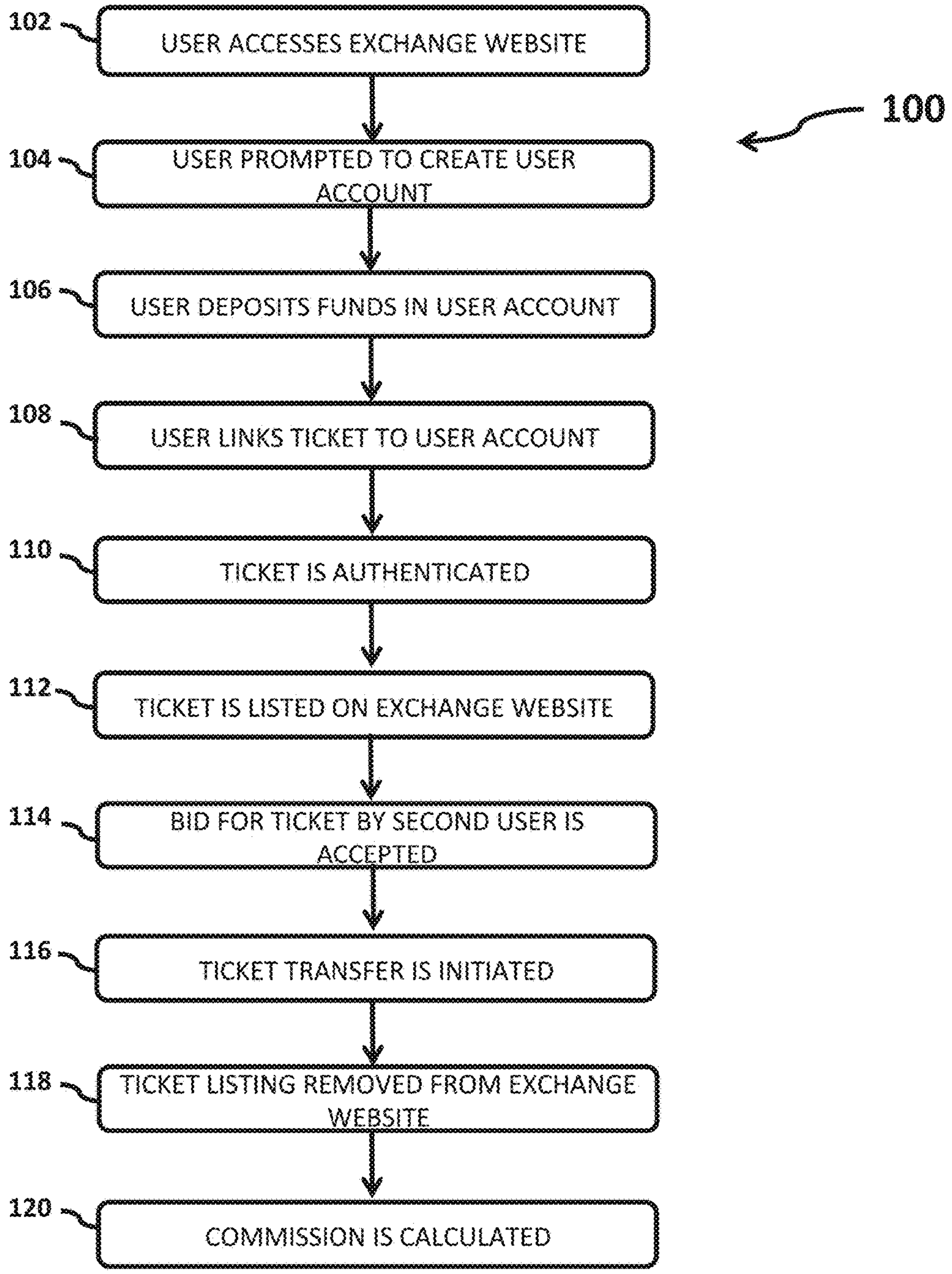
FIG. 3 is a flowchart of a method that may be used with the system shown in FIG. 1, according to a first embodiment of the present invention.

FIG. 3 is a flowchart of method 100 that may be used with the system 10 to allow a processing device to allow users to exchange wagers online. The method includes a plurality of steps. Each method step may be performed independently of, or in combination with, other method steps. Portions of the method may be performed by any one of, or any combination of, the components of the system 10.

In a first step 102, a user accesses, via the communications unit 32 and the hosting unit 34, an exchange website associated with the wagering service. The first time the user accesses the website, the user is considered a guest, but may be required to register a user account in order to buy and/or sell wagers.

In a second step 104, the user may be prompted, by the profile management unit 38, to create a user account. The user may be required to provide personal information, e.g., name, address, phone number, e-mail address, bank account or other fund source information, and any other information relevant to exchanging wagers.

In a third step 106, the user may be required, by the profile management unit 38, to deposit funds to be associated with the user account to allow the user to buy and/or sell wager using the exchange system. The wagering service may require that the fund amount exceed a predefined minimum threshold.

In a fourth step 108, the user may provide, by the ticket management unit 40, information associated with a ticket corresponding to at least one live wager to be linked to the user account. A "live" wager may be considered one that is associated with an event (e.g., a sporting event, race, or fantasy sports event), the outcome of which has not yet been determined, and thus the holder of the wager is not yet entitled to collet winnings (if any).

In a fifth step 110, the authentication unit 36 may verify whether the wager is "live" and thus eligible for exchange.

In a sixth step 112, the user may list, by the ticket management unit 40, the ticket on the exchange system. The user (or, in alternative embodiments, the wagering service) may choose a bidding process to be associated with the ticket exchange. Any type of bidding process may be used. For example, typical bidding processes include: (1) accepting the highest bid as the winning bid, or (2) accepting the first bid to reach a predefined threshold within a predefined time frame as the winning bid. The user (or, in alternative embodiments, the wagering service) may request an estimate of the value of the ticket by the ticket management unit 40. The ticket management unit 40 may use an algorithm to determine the value of a ticket at a certain point in time. The estimate is intended to provide useful information about the present value of the ticket, which may be different from the value of the ticket at the time of purchase by the user. The estimate may assist the user or wagering service to set the price of the ticket in the listing on the exchange. However, it is contemplated that the price of the ticket may be set at any value, regardless of the estimate provided.

In a seventh step 114, the ticket management unit 40 accepts a bid from a second user for the purchase of the ticket.

In an eighth step 116, the ticket management unit 40 initiates the ticket transfer. The ticket management unit 40 places the ticket in the second user's user account, deducts funds equivalent to the bid amount from the second user's user account, and deposits the funds into the first user's user account.

In a ninth step 118, the ticket management unit 40 removes the ticket listing from the exchange system.

In a tenth step 120, the ticket management unit 40 calculates a commission for the wagering service based on the bid amount.

It will be understood that method 100 may apply in the legal online gaming context as well as the online fantasy sports and online racetrack betting contexts.

Figure 4:
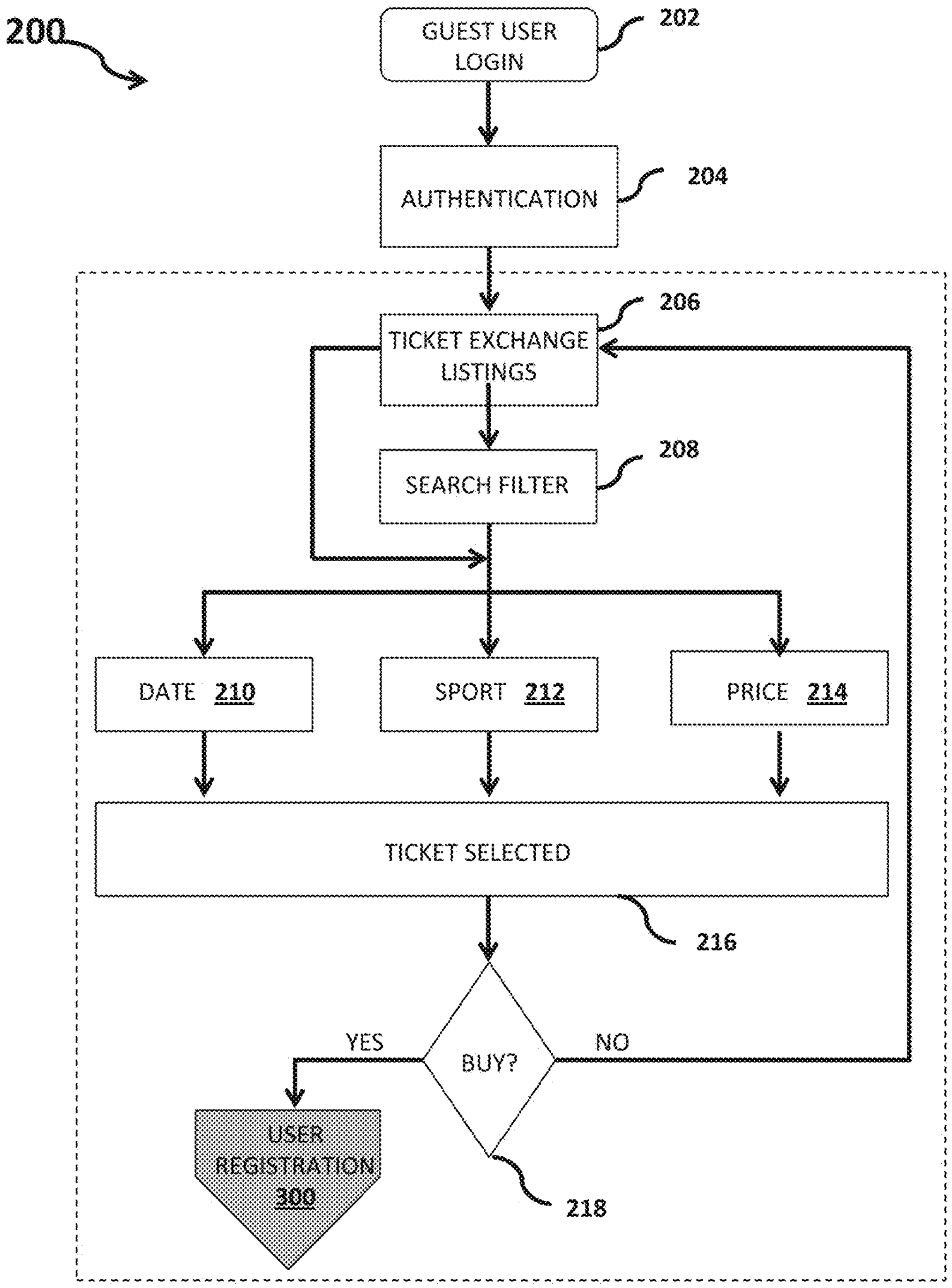
FIG. 4 is a flowchart of a guest login process, according to a first embodiment of the present invention.

FIG. 4 is a flowchart of the first step 102 of method 100. A guest login process 200 is shown. At step 202, a guest user may access, via the communications unit 32 and the hosting unit 34, an exchange website associated with the wagering service via a guest link available on a user login screen. At step 204, the authentication unit 36 validates the guest login credentials by retrieving information from the database 22.

At step 206, all available tickets in the ticket exchange system 10 are displayed to the user. From the list, at step 208, the user has the option to search for the tickets using a search filter. The listings may be additionally sorted by date 210, by sport 212, and/or by price 214. From the list, the user may select a particular ticket to see detailed information about the ticket, at step 216. The information may include, for example, the wager(s) associated with the ticket, the date(s) associated with the wager(s), the sport(s) associated with the wager(s), and the price(s) associated with the wager(s). At step 218, the user may decide to purchase the ticket (or a fraction of the ticket; see process 1300, FIG. 15). If the user decides not to purchase the ticket, he may be redirected to step 206 to view the listing of available tickets. If the user decides to purchase the ticket, he may be prompted, by the profile management unit 38, to create a user account using process 300.

Figure 5:
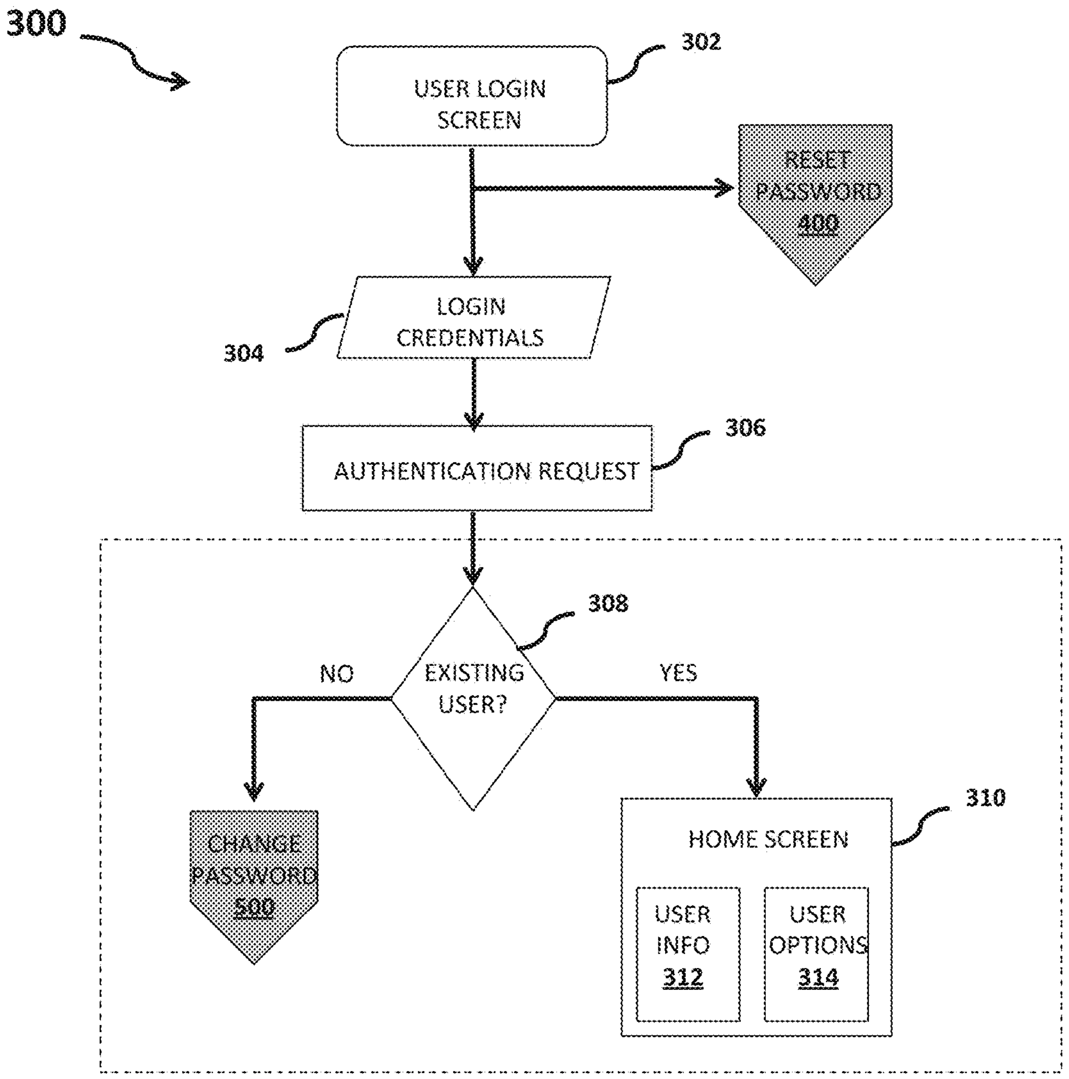
FIG. 5 is a flowchart of a user account creation process, according to a first embodiment of the present invention.

FIG. 5 is a flowchart of the second step 104 of method 100. A user account creation process 300 is shown. At step 302, a registered user may access the website through a registered user login screen. If a user has forgotten his password, he may use process 500 to reset the password. At step 304, the registered user may be prompted, by the profile management unit 38, to enter login credentials, such as a username and a password.

At step 306, the communications unit 32 may send an authentication request to the authentication unit 36 to validate the login credentials. The authentication unit 36 may compare the login credentials against information stored about the user in database 22.

At step 308, the authentication unit 36 determines whether the user is a first-time user or an existing user based on the received login credentials. If the user if a first-time user, the communications unit 32 sends the information to the hosting unit 34, which presents a reset password screen to the user. The user may be prompted, by the profile management unit 38, to change (or create) his password using process 400.

At step 310, if the user is an existing user, the user is directed to a home screen by hosting unit 34. At the home screen, the user may view a variety of information 312, which may be separated into subpages. Information 312 located on subpages may include, for example, open wager list (see FIG. 8, process 600), exchange list (see FIG. 9, process 700), user preferences, user account information, and bidding history. User options 314 may be available to the user from the home screen, including an option to refresh data and log out of the user account.

Figure 6:
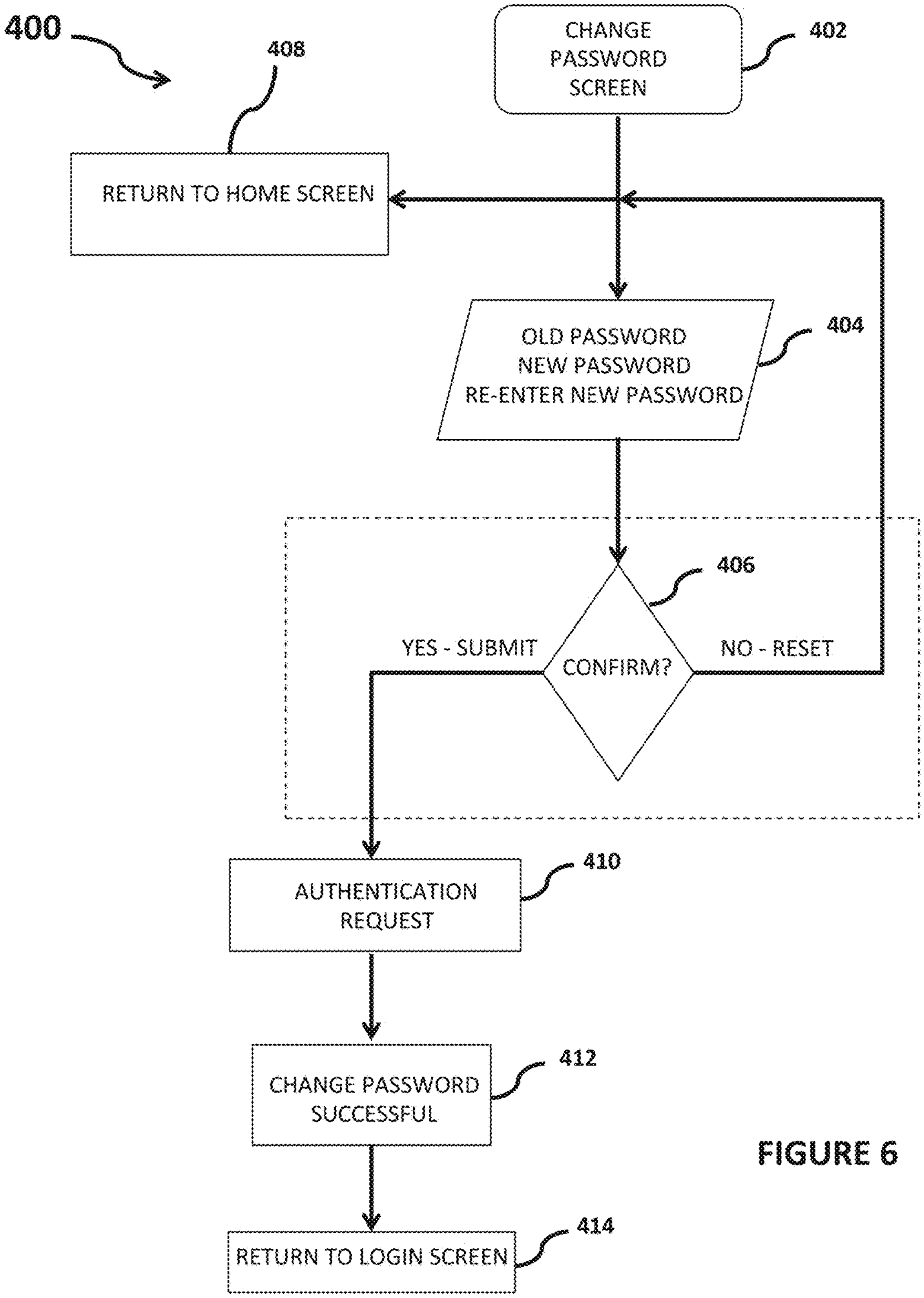
FIG. 6 is a flowchart of a change password process, according to a first embodiment of the present invention.

FIG. 6 is a flowchart of the change password process 400. At step 402, a registered user may be directed to a change password screen. At step 404, the user is prompted, by the profile management unit 38, to provide his old password and a new password that is different from the old password. At step 406, the user may be prompted to confirm that he wishes to change his password. If the user declines to confirm the password change, the password entry is reset and the user is returned to the change password screen. From the change password screen, the user may optionally choose to return to the home screen at step 408.

If the user confirms the password change, the new password entry is submitted. At step 410, the communications unit 32 sends a request to authentication unit 36 to validate the new password and store the new password in database 22. At step 412, the communications unit 32 may display a message to the user indicating that the password change was successful. At step 414, the user is returned to the login screen.

Figure 7:
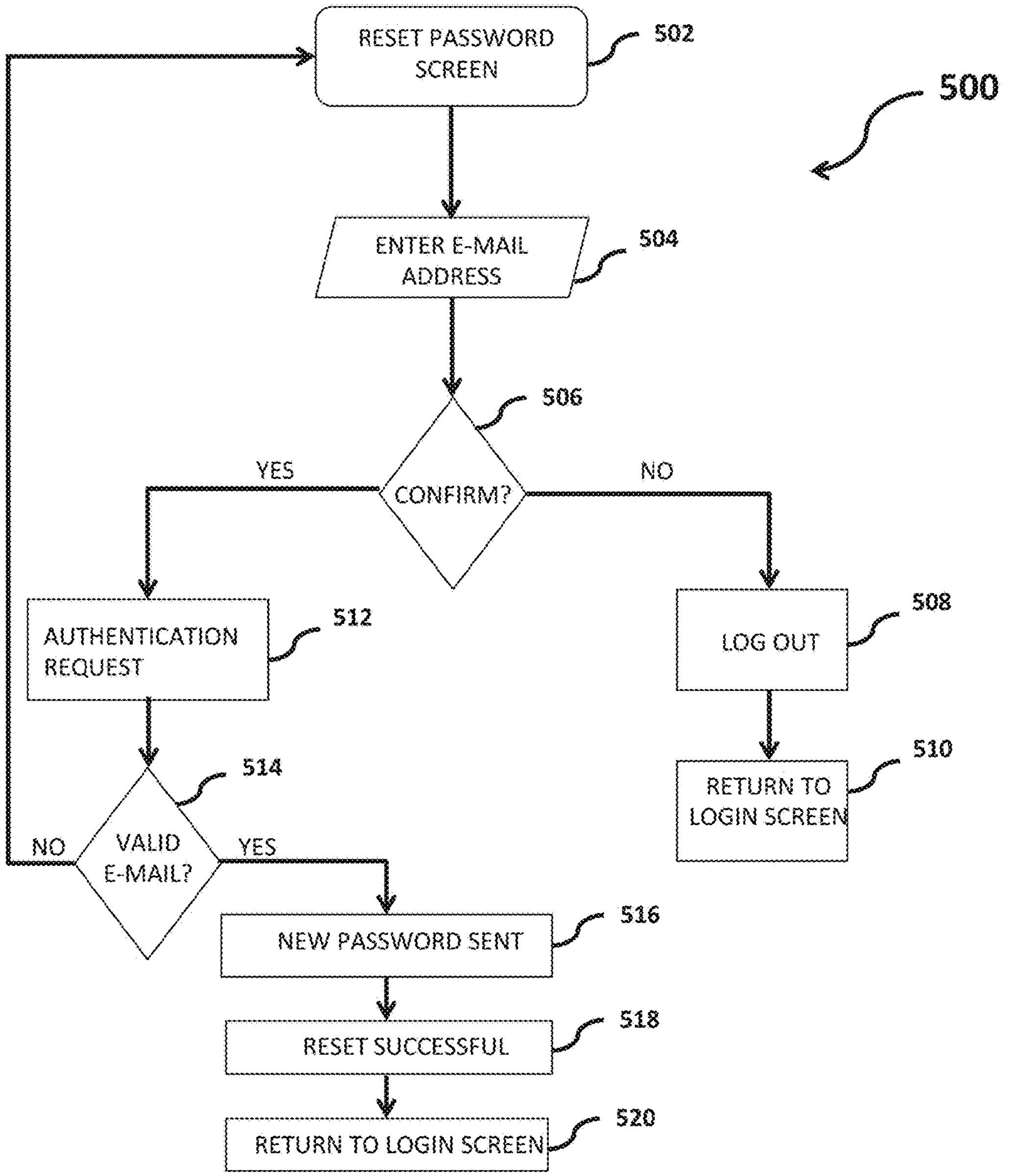
FIG. 7 is a flowchart of a reset password process, according to a first embodiment of the present invention.

FIG. 7 is a flowchart of the reset password process 500. At step 502, a registered user may be directed to a reset password screen. At step 504, the user is prompted, by the profile management unit 38, to provide an e-mail address associated with the user account. At step 506, the user may be prompted to confirm that he wishes to reset his password. If the user declines to confirm the password reset, the user may be prompted to log out at step 508. The user is then returned to login screen at step 510.

If the user confirms the password reset, at step 512, an authentication request is sent by the communications unit 32 to the authentication unit 36. At step 514, the authentication unit 24 searches database 22 to determine whether the e-mail address provided is associated with a stored user account. If the e-mail is not found in database 22, the user is returned to the reset password screen. If the e-mail is found in database 22, a new password is sent to the e-mail address at step 516. At step 518, the communications unit 32 may display a message to the user indicating that the password reset was successful. At step 520, the user is returned to the login screen.

Figure 8:
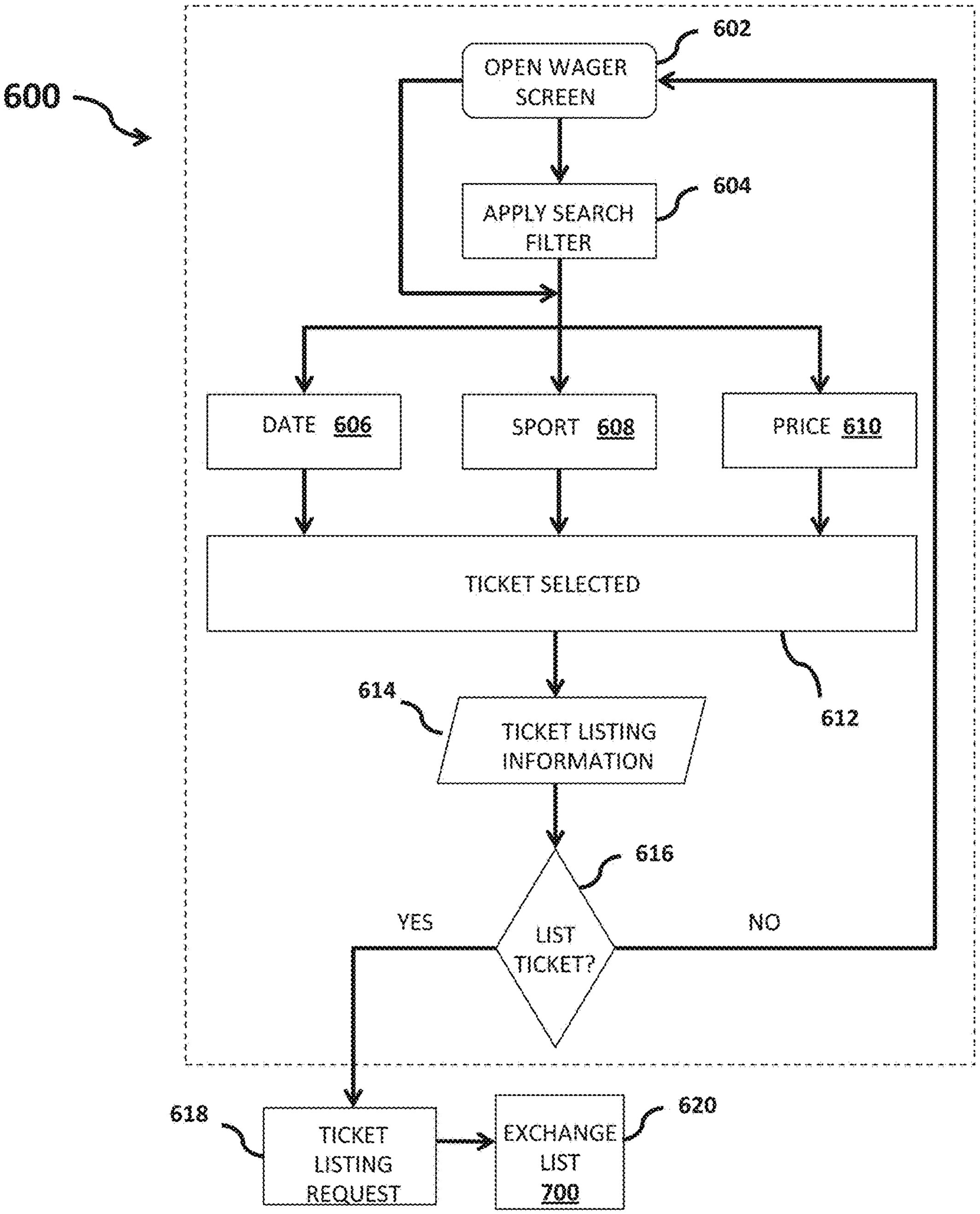
FIG. 8 is a flowchart of a list ticket process, according to a first embodiment of the present invention.

FIG. 8 is a flowchart of the sixth step 112 of method 100. A process 600 for users to view, filter, and sort open wager tickets and list ticket(s) for bidding is shown. At step 602, a registered user may be directed to an open wager screen that displays all tickets owned by the user. From the list, the user has the option to search tickets using the search filter at step 604. The tickets may additionally be sorted by date 606, by type of sport 608, and/or by price 610.

From the list, the user may select a particular ticket to see detailed information about the ticket, at step 612. The information may include, for example, the wager(s) associated with the ticket, the date(s) associated with the wager(s), the sport(s) associated with the wager(s), and the price(s) associated with the wager(s).

At step 614, the user may be prompted, by the ticket management unit 40, to enter certain information about the ticket to be listed, for example, the bidding process, for example, amount, bid closure time, bid type, and a percentage of the wager(s) to be sold. The user may choose to sell only a fraction (percentage) of his interest in a particular wager. The wagering service may establish the fraction increments that the user is allowed to sell, such as, for example, a minimum of 10% of the user's interest and additional increments of 5% above the minimum, etc. (see process 1300, FIG. 15).

At step 616, the user may be prompted to confirm that he wishes to list the ticket for bidding. If the user declines to list the ticket for bidding, the user is returned to the open wager screen.

If the user confirms the listing, at step 618, the communications unit 32 sends a request to ticket management unit 40 to save the listing information in database 22 and add the listing to the exchange list. The listing information may include information about whether the ticket is fractioned and assigned ticket type, as discussed in more detail below. At step 620, the user is directed to the exchange list (see FIG. 9, process 700).

Figure 9:
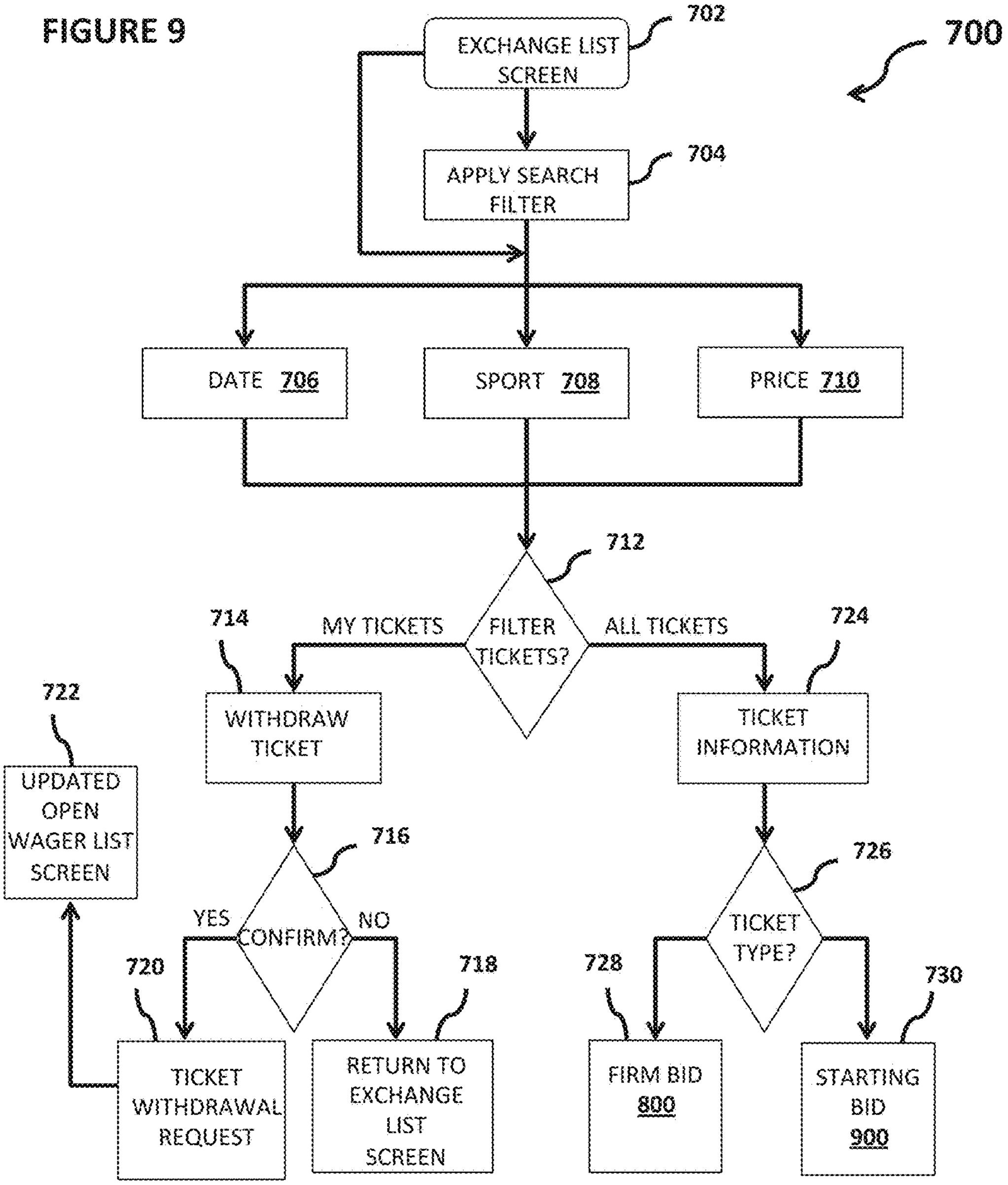
FIG. 9 is a flowchart of a process users to view, filter, and sort exchange list tickets and bid on and/or purchase tickets from the exchange list, according to a first embodiment of the present invention.

FIG. 9 is a flowchart of a process 700 for users to view, filter, and sort exchange list tickets and bid on and/or purchase tickets from the exchange list. At step 702, a user accesses the exchange list screen, which displays all tickets that are available for bidding by all users in the exchange system. From the list, the user has the option to search tickets using the search filter at step 704. The tickets may additionally be sorted by date 706, by type of sport 708, and/or by price 710. Although the exchange list, by default, displays all tickets that are available for bidding by all users in the exchange system, the tickets may be additionally filtered at step 712 to separately display the tickets listed by the user and the tickets listed by all other users. In one embodiment of the invention, the user may be able to toggle between two screens containing the separate lists by swiping left or right on a handheld device with a touchscreen.

At step 714, the user may decide to withdraw a ticket from the list of tickets owned by the user. The wagering service may provide conditions under which a ticket may be withdrawn from the ticket listing which may include, for example, a requirement that the event is no longer active and/or that the ticket has not been purchased or bid on by another user. At step 716, the user may be prompted to confirm the withdrawal of the ticket from the exchange list. If the user declines to confirm the withdrawal, the user may be returned to the exchange list screen at step 718.

If the user confirms the withdrawal, at step 720, the communications unit 32 sends a request to ticket management unit 40 to remove the listing from the exchange list and add the listing to the open wager list (see FIG. 7, process 500). The ticket management unit 40 may decline to remove the listing from the exchange list, for example, if the ticket has an existing active bid. If the ticket is a fractioned ticket, the withdrawal may further follow process 1600 (see FIG. 18). At step 722, the user is directed to an updated open wagers screen. When a ticket is successfully withdrawn, the ticket may revert to the ticket's original status, or the most recent status prior to the listing from which it has been withdrawn.

By way of example, a user may buy a ticket at 50:1 odds that the Carolina Panthers will win the Super Bowl. The ticket cost $500 and has a maximum payout of $25,500. Before the Super Bowl game begins, the user decides to list 25% of the ticket for $3,000. No other user buys the ticket prior to the start of the game. During the game, it appears that Carolina, down by 6 points, may take the lead on the next offensive possession. Because no user has purchased the ticket, the user withdraws the for-sale child ticket (equaling 25% of the original, parent ticket). The user now owns 100% of the original (parent) ticket again.

As another example in the context of horse racing, a user may purchase a ticket with a “Pick 5” payout structure. The user decides to list 20% of the ticket in 2% increments due to the large potential payout. Thus, the user lists 10 child tickets for 2% each and retains 80% of the original (parent) ticket. Prior to Post Time of the race, the user may decide to withdraw all or some of the child tickets from sale. For instance, if the user withdraws 5 of the child tickets, the user would own 90% of the parent ticket, and thus be entitled to 90% of the payout if the ticket is a winning ticket. The owners of each of the remaining tickets would be entitled to 2% of the payout if the ticket is a winning ticket.

At step 724, the user may select a particular ticket from the list of all tickets owned by all other users and view information associated with that ticket. The information may include, for example, the wager(s) associated with the ticket, the date(s) associated with the wager(s), the sport(s) associated with the wager(s), and the price(s) associated with the wager(s).

At step 726, the ticket is determined to be a firm bid ticket or another type of ticket. If the ticket is a firm bid ticket, the user is prompted to begin the firm bid process 800 (see FIG. 10). If the ticket is not a firm bid ticket, the user may be prompted to begin the starting bid process 900 (see FIG. 11).

Figure 10:
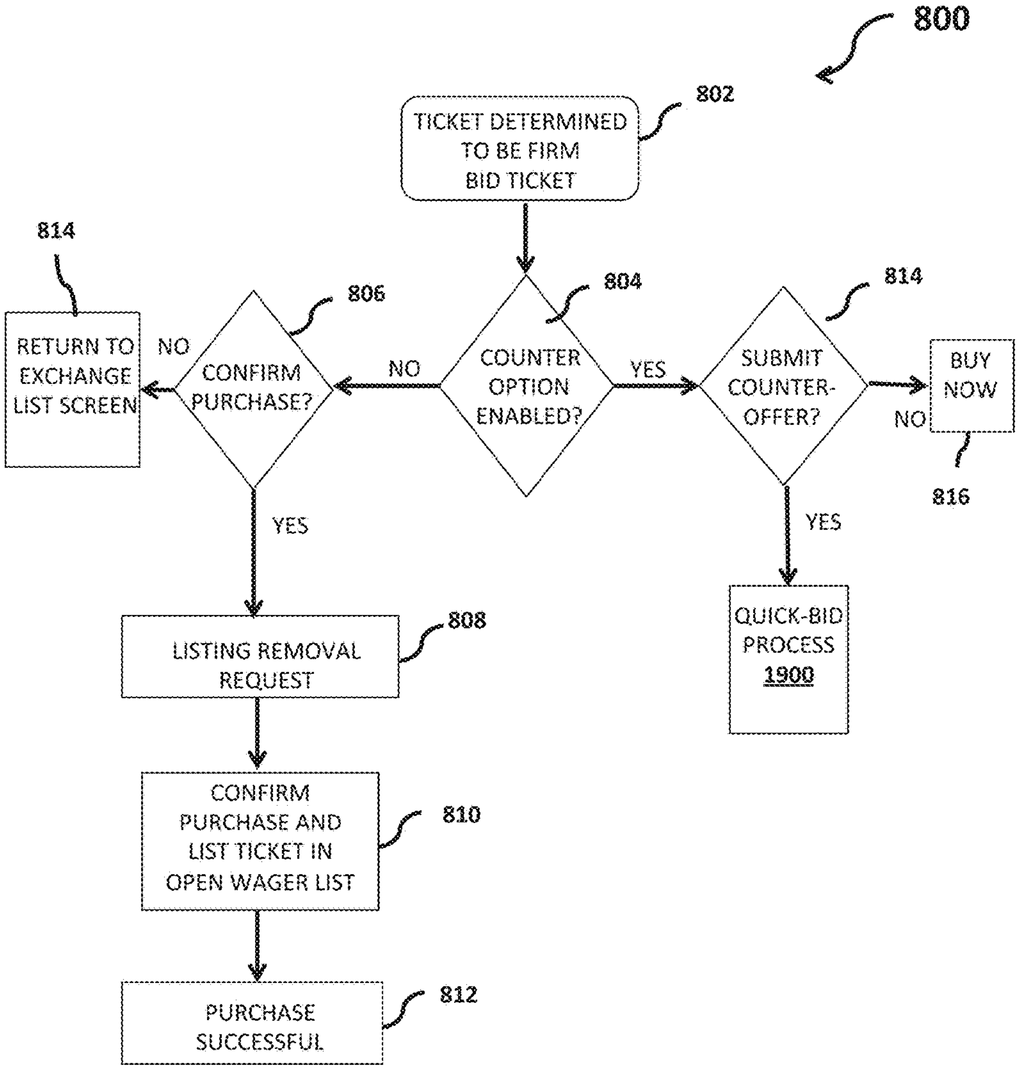
FIG. 10 is a flowchart of a firm bid buying process, according to a first embodiment of the present invention.

FIG. 10 is a flowchart of a firm bid buying process 800. At step 802, a ticket selected by a user for purchase is determined to be a firm bid ticket. At step 804, the system determines whether the counter option is enabled. Both the buyer and the seller must enable the counter option in their account preferences for the counter option to be shown as enabled for particular ticket purchase. If the counter option is not enabled, the user is prompted to confirm purchase of the ticket at step 806. At step 808, a request is sent to ticket management unit 40 to remove the ticket listing from the exchange list, change the status of the ticket in the seller's account to INACTIVE, and add the ticket as ACTIVE to the user's open wager list (see FIG. 7, process 500). At step 810, the purchase is confirmed and the ticket is displayed in the user's open wager list. At step 812, the communications unit 32 may display a message to the user indicating that the purchase was successful.

If the user declines to confirm the purchase, the user is returned to the exchange list screen at step 814.

If the counter option is enabled, the user may decide to submit a counter-offer at step 814. The user may be allowed to submit a predetermined number of counter-offers to the original asking price of a firm bid ticket. In a preferred embodiment, three counter-offers are permitted. Alternatively, the user may be permitted to select a "buy now" option at step 816 to purchase the ticket at the listed price without submitting counter-offers even though the counter option is enabled.

Figure 21:
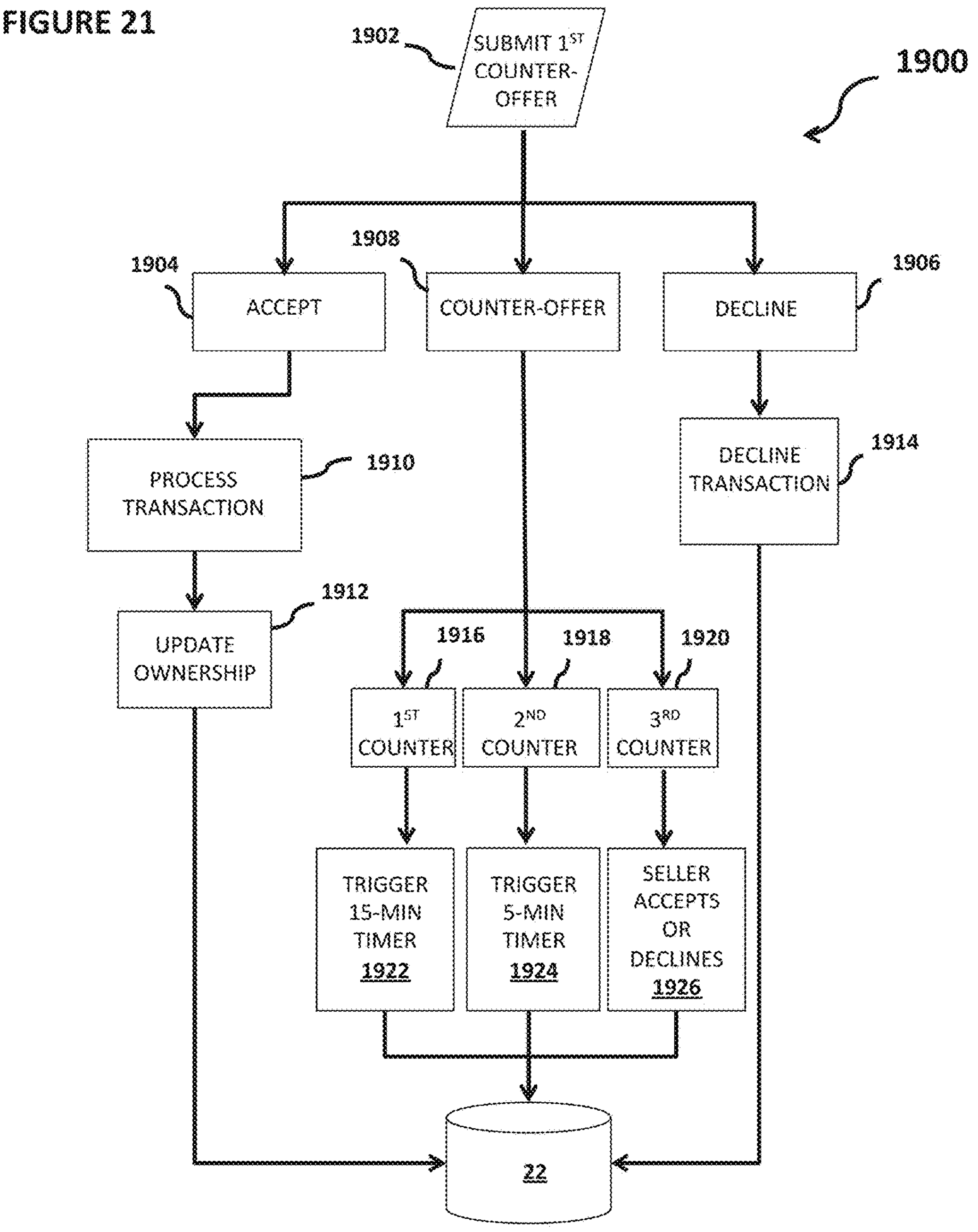
FIG. 21 is a flowchart of a quick-bid process, according to a first embodiment of the present invention.

If the user chooses to place a counter-offer, at step 814, the quick-bid process 1900 is initiated (see FIG. 21).

Figure 11:
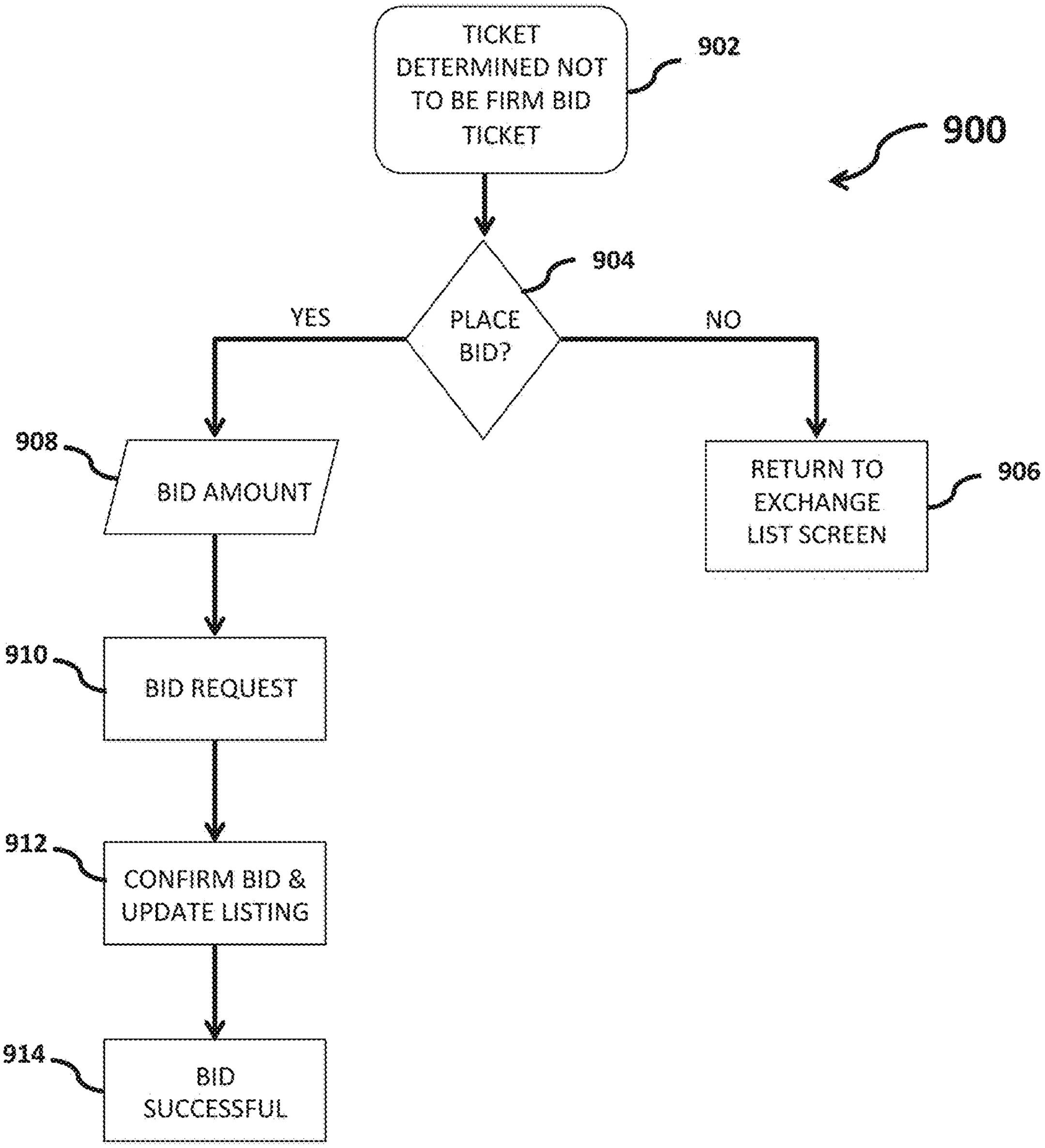
FIG. 11 is a flowchart of a starting bid buying process, according to a first embodiment of the present invention.

FIG. 11 is a flowchart of a starting bid buying process 900. At step 902, a ticket selected by a user for purchase is determined not to be a firm bid ticket. At step 904, the user may decide whether to place a bid on the selected ticket. If the user chooses not to bid on the selected ticket, the user is returned to the exchange list screen at step 906.

If the user chooses to bid on the selected ticket, the user enters a bid amount at step 908. At step 910, communications unit 32 sends a request to ticket management unit 40 to store the bidding information in database 22 and update the ticket listing on the exchange list with the bid amount. At step 912, the bid is confirmed and the bid amount is reflected in the ticket listing on the exchange list. At step 914, the communications unit 32 may display a message to the user indicating that the purchase was successful.

Figure 12:
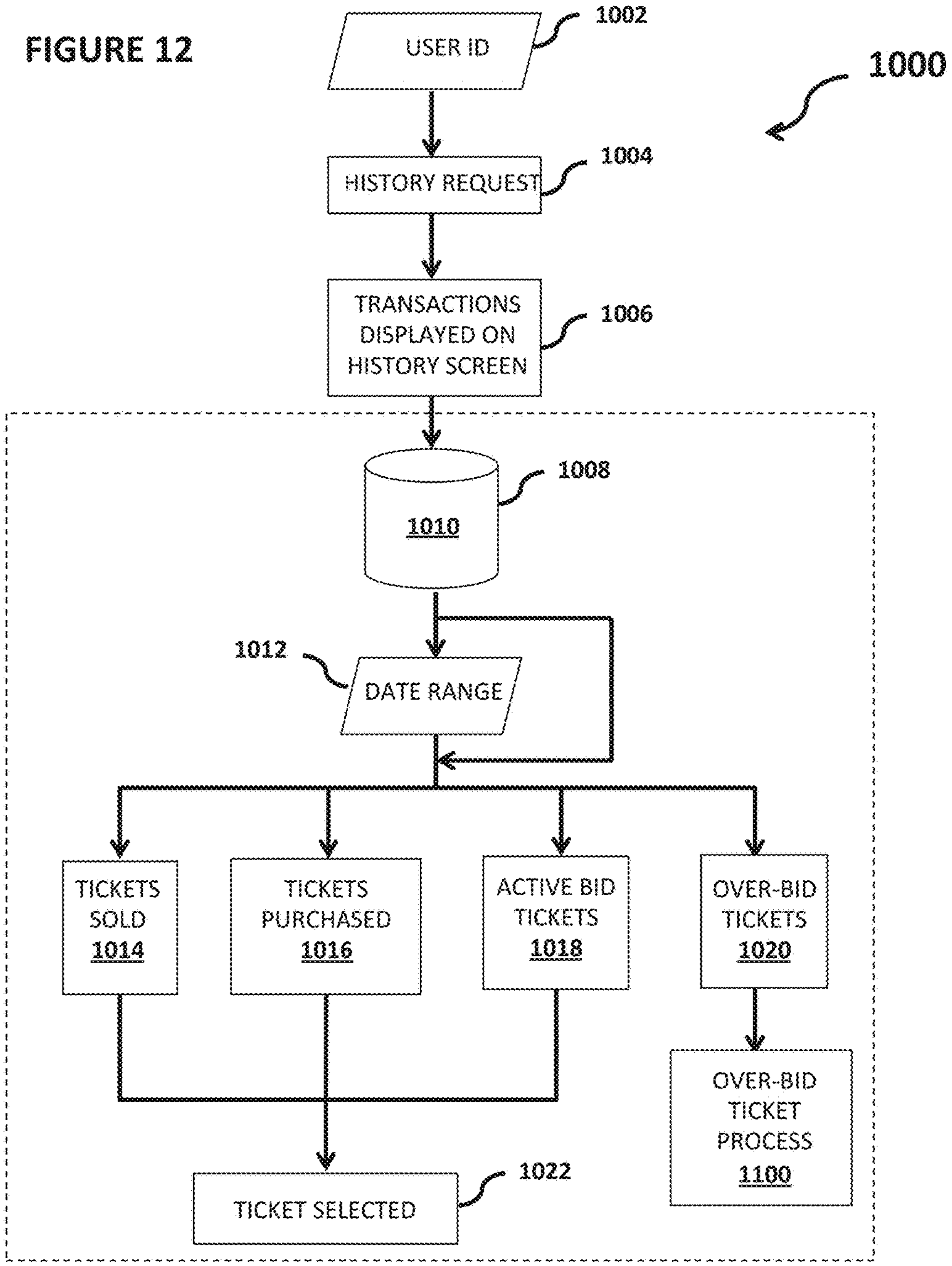
FIG. 12 is a flowchart of a view history process, according to a first embodiment of the present invention.

FIG. 12 is a flowchart of a view history process 1000 to allow a registered user to view all transactions carried out by the user. At step 1002, a user ID is entered (either manually by the user or by the system when the user logs in).

At step 1004, the communications unit 32 may send a request to the profile management unit 38 to fetch all transactions associated with the user and stored in database 22. At step 1006, the list of transaction is displayed on a history screen. The transaction list may include, for example, tickets sold, tickets purchased, active bids, over-bid tickets (i.e., tickets that have received a higher bid than the user's most recent bid), or any other information about transactions associated with the user. At step 1008, the transactions fetched from database 22 may be stored in a local database 1010.

The list of transactions may be filtered by date. At step 1012, the user enters date range including a start date and an end date. The filtered results may be displayed in separate tabs based on the type of ticket (e.g., tickets sold 1014, tickets purchased 1016, active bid tickets 1018, and over-bid tickets 1020). From the filtered list, the user may select a particular ticket at step 1022 to see the ticket details. The information may include, for example, the wager(s) associated with the ticket, the date(s) associated with the wager(s), the sport(s) associated with the wager(s), and the price(s) associated with the wager(s).

When a ticket is selected from over-bid tickets 1020, over-bid ticket process 1100 is activated.

Figure 13:
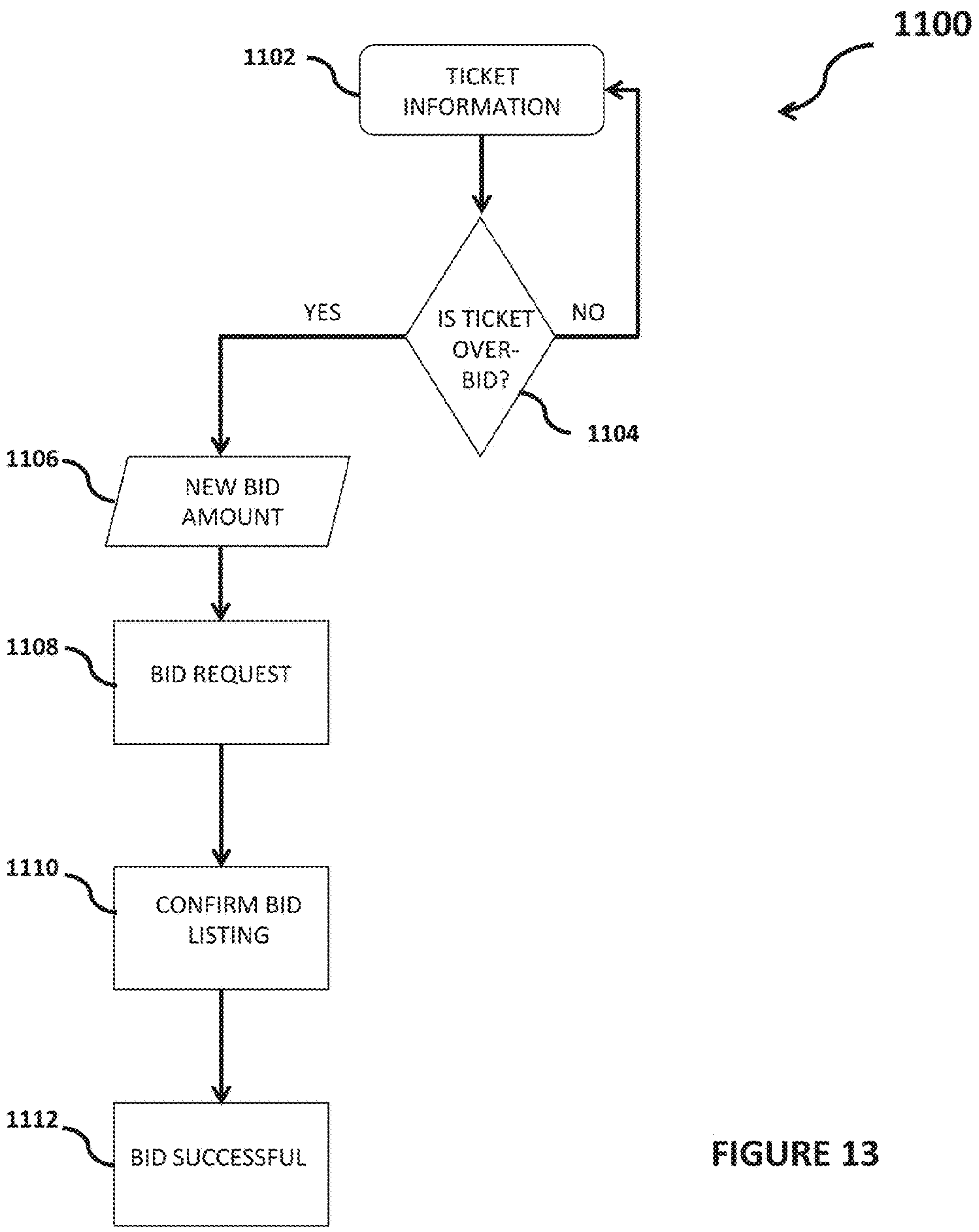
FIG. 13 is a flowchart of an overbid ticket process, according to a first embodiment of the present invention.

FIG. 13 is a flowchart of an over-bid ticket process 1100 to allow a user to submit a new bid amount. At step 1102, the ticket information associated with a ticket selected by the user is displayed. At step 1104, the system determines whether the ticket is over-bid. If the ticket is not over-bid, the user continues to view the ticket information and the process ends. If the ticket is over-bid, the user may enter a new bid amount at step 1106.

At step 1108, communications unit 32 sends a request to ticket management unit 40 to store the bidding information in database 22 and update the ticket listing on the exchange list with the bid amount. At step 1110, the bid is confirmed and the bid amount is reflected in the ticket listing on the exchange list. At step 1112, the communications unit 32 may display a message to the user indicating that the purchase was successful.

Pricing Algorithm

A pricing mechanism may be utilized by the exchange system to assist exchange system users in determining a fair value of the wagers/tickets/entries listed on the exchange. The pricing mechanism may provide low, middle, and high estimates that incorporate the potential payout of a winning wager/ticket/entry. Using this information, exchange system users may make informed buying and selling decisions. The pricing mechanism follows a general principal regardless of the specific application: prices are suggested based on an algorithm that creates an "equity" value based on the potential win payout for a wager/ticket/entry and uses the current marketplace odds to determine an implied probability of that winning outcome actually occurring. In other words, the value of any live wager listed on the exchange is its potential winnings weighted against the likelihood that the winning outcome of that wager actually occurs. If the entire wager is offered for sale, 100% of the value can be purchased. If a fraction of the wager is offered for sale, then that fraction of the wager can be purchased.

Figure 14:
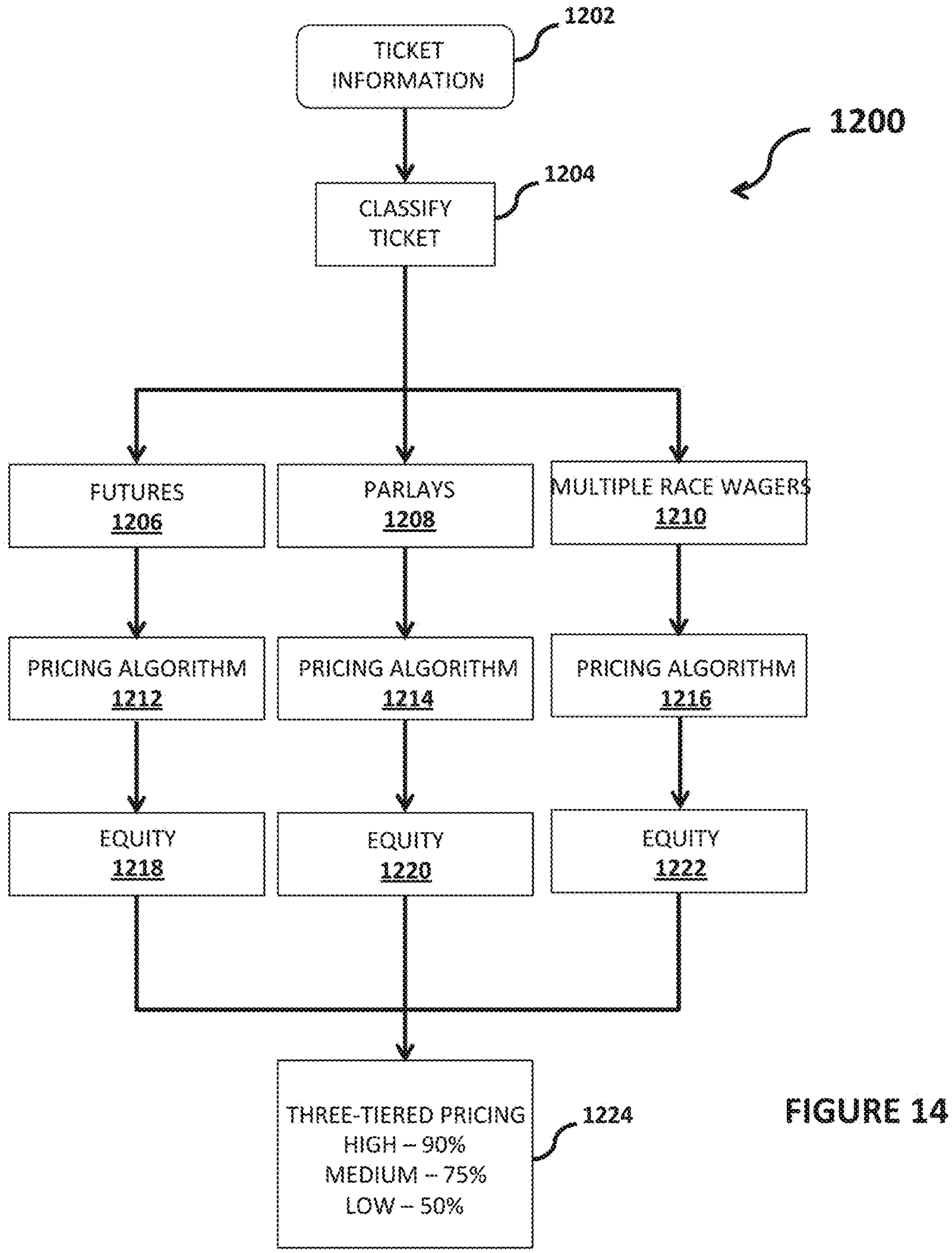
FIG. 14 is a flowchart of a classification and pricing algorithm process, according to a first embodiment of the present invention.

FIG. 14 is a flowchart of a process for classifying a ticket and applying a pricing algorithm. At step 1202, the ticket information associated with a ticket selected by the user is displayed. At step 1204, the ticket is classified into a category: Futures 1206, Parlay 1208, or Multiple Race Wager 1210. Pricing algorithms 1212, 1214, and 1216 are applied, which derives the equity values 1218, 1220, and 1222 to help users buy or sell a ticket. Each ticket type has different methods to compute equity. At step 1224, a three-tiered pricing model is generated, with High, Medium, and Low values of the actual equity. The percentage threshold for each of the three tiers may be adjusted. In the preferred embodiment, the High tier is set at 90%, the Medium tier is set at 75%, and the Low tier is set at 50%.

The pricing algorithm 1212 for Futures 1206 includes a Futures Ticket Pricing Mechanism (FTPM) that uses one division equation consisting of one denominator and one numerator. The FTPM equation is used to determine a fair market value of the ticket being offered for sale. The FTPM equation is as follows:

$$\text{Equity 1218} = \frac{\text{Potential Payout}^*}{\text{Implied Probability of Potential Payout Occurring}}$$

$^*\text{Potential Payout} = (\text{odds to win} \times \text{amount wagered}) + \text{amount wagered}$ Odds to win and amount wagered (original ticket price) values may be found in the ticket information.

EXAMPLE

User purchases a $250 ticket on the St. Louis Cardinals to win the World Series at odds of 500 to 1. The total payout for the ticket is shown on the ticket ($125,250). At time of ticket sale by the user, the playoffs have just begun and there are only eight teams left who can win the World Series, so the odds on the Cardinals are now 15 to 1.

The suggested equity of the ticket will be:

$$\frac{\$125{,}250}{16} = \$7{,}828.13$$

If the user wishes to sell 10 percent of his interest in the ticket, the total equity value would be $782.81 ($7,828.13/10). If the user wishes to sell 75% of his interest in ticket, the equity value would be $5,871.10 ($7,828.13*(0.75)). The three-tiered pricing model would then be generated, including Low, Medium, and High values.

A parlay is a cumulative series of bets (two or more) in which the winnings accrue from each transaction and may be used as a stake for a future bet. The pricing algorithm 1214 for Parlays 1208 includes a Parlay Ticket Pricing Mechanism (PTPM) that uses one multiplication equation. The PTPM equation is used to determine a fair market value of the ticket being offered for sale. The PTPM equation is as follows:

(Potential Payout)×(Implied Probability of Potential Payout Occurring)*

* based on the current odds of the last leg of the parlay

Moneylines (MLB) value (found in the ticket information) is used to calculate the implied probability, which may change over time. There are two types of MLBs: Minus MLBs and Plus MLBs. Minus MLBs are expressed in terms of the amount risked. For example, if the minus MLB odds for a wager is −115, the user must wager $115 to win $100 on a winning bet. Plus MLBs are expressed in terms of the amount of money potentially earned. As an example, if the plus MLB odds are +115, the user would earn $115 for every $100 wagered on a winning bet. The formula used to calculate the implied probability differs by MLB type, as shown below:

Minus MLB odds:

$$\text{Implied Probability} = \frac{(-(\text{minus } MLB \text{ odds}))}{((-(\text{minus } MLB \text{ odds})) + 100)}$$

Plus MLB odds:

$$\text{Implied Probability} = \frac{100}{(\text{plus } MLB \text{ odds} + 100)}$$

Using the above implied probability value of the final leg of the parlay, equity is calculated as follows:

$$\text{Equity 1220} = \frac{\text{Potential Payout}^*}{\text{Implied Probability of Potential Payout Occurring}}$$

$^*\text{Potential Payout} = (\text{odds to win} \times \text{amount wagered}) + \text{amount wagered}$

EXAMPLE

A customer purchases a $200 three-team parlay ticket, picking Auburn, Ala., and South Carolina to cover the spreads. The total payout for the ticket is $1,400 (shown on the ticket). At the time when the user decides to sell the ticket, both Auburn and Alabama have covered the respective spreads, and the South Carolina game begins in one hour. The current market shows that South Carolina is a 3-point favorite and odds are being offered at −120. The implied probability will be calculated as follows:

$$\text{Implied Probability} = \frac{(-(-120))}{((-(-120)) + 100)}$$

$$\text{Implied Probability} = \frac{120}{120 + 100}$$

$$\text{Implied Probability} = .5454$$

Knowing the implied probability, the equity of the ticket is calculated as follows:

$1,400(potential payout)*(0.5454)=$763.56

The three-tiered pricing model would then be generated, including Low, Medium, and High values.

The pricing algorithm for Multiple Race Wager 1210 includes a Multiple Race Wager Pricing Mechanism (MRWPM) that uses one division equation consisting of one denominator and one numerator. The MRWPM equation is used to determine a fair market value of the ticket being offered for sale. The MRWPM equation is as follows:

$$\text{Equity 1222} = \frac{\text{Potential Payout}^*}{\text{Implied Probability of Potential Payout Occurring}}$$

$^*\text{Potential Payout} = (\text{odds to win} \times \text{amount wagered}) + \text{amount wagered}$ Current win odds for each horse will be provided by the wagering service and implied probability values may be predefined and tabulated for the different odds to win values.

If there are n horses in the last leg, equity values may be calculated for each horse so that total equity of the ticket may be determined as follows:

$$\text{Total Equity}=\text{Equity}(1)+\text{Equity}(2)++\text{Equity}(n)$$

EXAMPLE

A customer purchases a $1 pick 3 ticket alive to three horses (e.g., runners 2, 6 and 8) in the final leg of a 10-horse field with the following betting odds:

2 horse is currently at 3/1 with a potential payout of $200

6 horse is currently at 6/1 with a potential payout of $400

8 horse is currently at 10/1 with a potential payout of $800

All of the listed odds in horse racing correspond to certain divisors. For example, a horse at 3/1 has a 25% implied chance of winning. For the purposes of this model, it is easier to be easier to divide the possible payout by the appropriate divisor (in this example, the divisor would be 4). Therefore, the calculation for the ticket in this example using divisors to determine overall equity is shown as follows:

2 horse: $200/4=$50

6 horse: $400/7=$57.14

8 horse: $800/11=$72.72

Total equity=$179.86 for every $1

Information about odds may be collected from any reputable source by the exchange system. For example, the exchange system may pull odds information from oddsmakers (e.g., casinos and sports books) in Las Vegas, which tend to set the general odds for the entire gaming industry. Very few wagering services deviate from the odds set by these larger providers because it potentially creates greater risk to offer better odds, or diminishes the number of wagers collected if lessor odds are offered. A web scraper or API tool may also be utilized by the exchange system to automatically collect odds as they are updated, e.g., approximately every 60-90 seconds.

Fractioned Ticket Exchange

One of the unique elements of the exchange system described herein is the ability to trade all or a fraction of a ticket/wager/entry. By selling only a fraction of a ticket, a user may create some liquidity for himself and still retain some interest in his original investment. The ability to sell fractioned tickets may increase the sale of 'gimmick' bets (e.g., futures, multiple team parlays, horse race Daily Doubles, Pick B's, 4's, 5's, 6's, etc.), which benefits wagering service providers. Because the user retains a partial interest in his initial investment, it continues to provide entertainment to the user and keeps the user engaged.

Selling Fractioned Ticket

Figure 15:
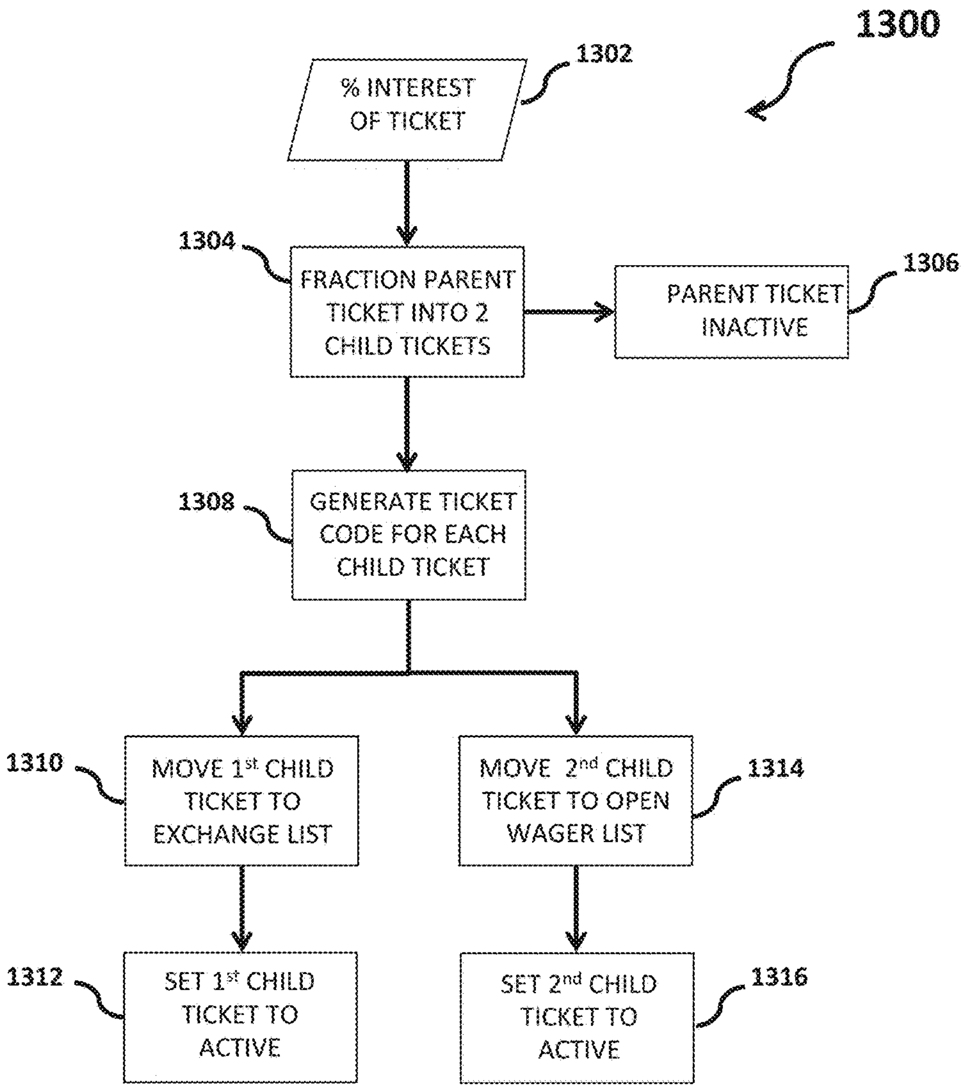
FIG. 15 is a flowchart of a ticket fractioning process, according to a first embodiment of the present invention.

Referring now to FIG. 15, a process 1300 for fractioning a ticket is shown. At step 1302, the user inputs a fraction value (percentage) that represents the amount of the user's interest in a particular ticket that the user wishes to sell (the "parent" ticket). The wagering service may establish the fraction increments that the user is allowed to sell, such as, for example, a minimum of 10% of the user's interest and additional increments of 5% above the minimum, etc., up to 100% of the user's interest.

At step 1304, the ticket management unit 40 splits the parent ticket into two child tickets by the value indicated by the user at step 1302. For example, if the user indicates he wishes to sell 50% interest in the parent ticket, the ticket management unit 40 would split the parent ticket into a first child ticket carrying 50% value of the parent ticket and a second child ticket carrying 50% value of the parent ticket.

At step 1306, the ticket management unit 40 sets the status of parent ticket to INACTIVE. The status also indicates that the parent ticket has been fractioned and that the parent ticket is no longer listed for sale. The ticket status information may be saved in database 22.

At step 1308, a ticket code is generated for each of the child tickets based on a ticket code of the parent ticket. At step 1310, the first child ticket is moved to the exchange list, where it is offered for sale. At step 1312, the ticket management unit 40 sets the status of first child ticket to ACTIVE. The status also indicates that the first child ticket is not fractioned and that it is listed for sale. The ticket status information may be saved in database 22.

At step 1314, the second child ticket is moved to the user's open wager list. At step 1316, the ticket management unit 40 sets the status of second child ticket to ACTIVE. The status also indicates that the second child ticket is not fractioned and that it is not listed for sale. The ticket status information may be saved in database 22.

Withdrawing Fractioned Ticket

As discussed with reference to FIG. 9 above, a specific process is implemented when a user attempts to withdraw from the exchange list a ticket that has been fractioned according to process 1300.

Figure 16:
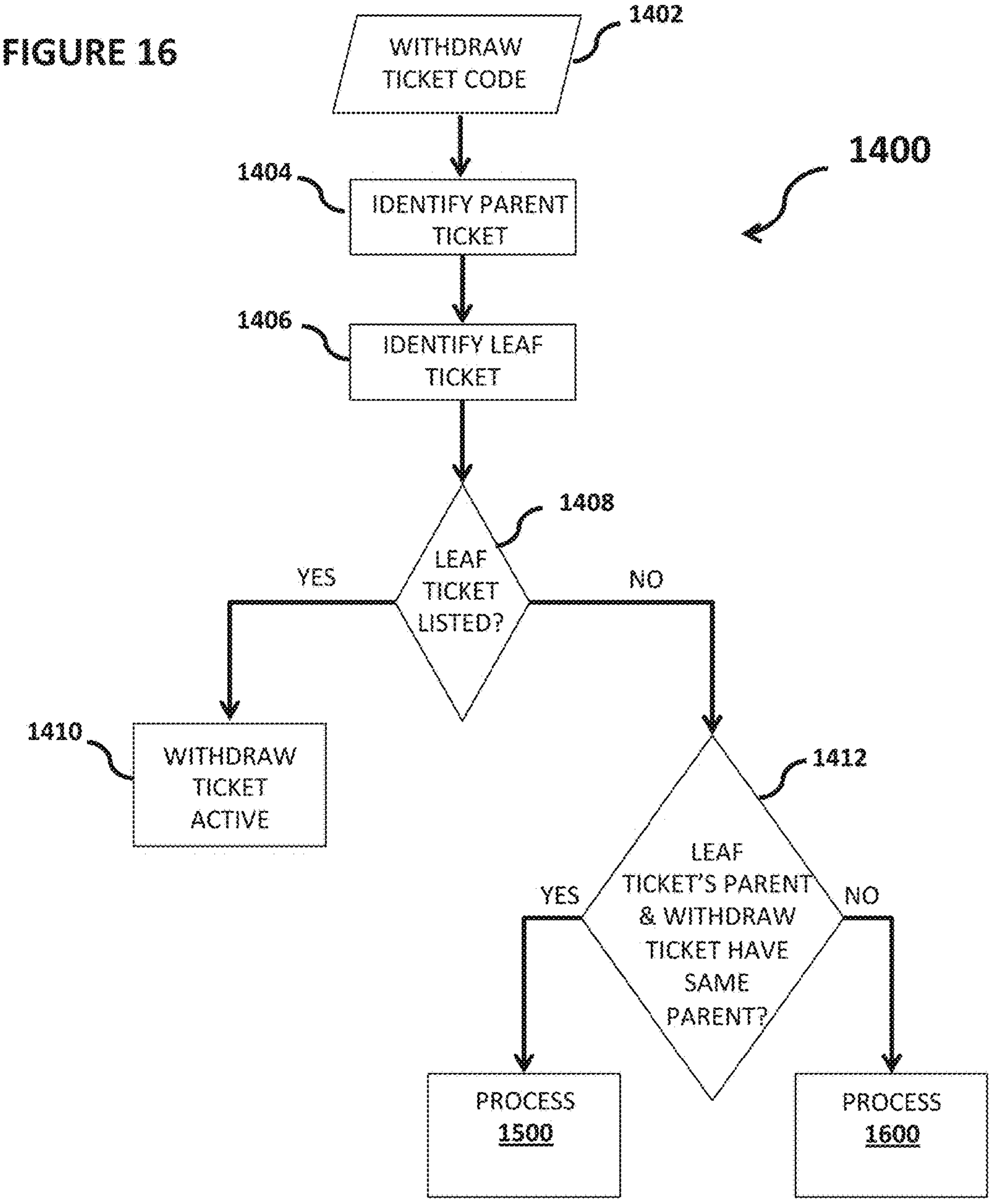
FIG. 16 is a flowchart of a fractioned ticket withdrawal process, according to a first embodiment of the present invention.

Referring now to FIG. 16, a process 1400 for withdrawing a fractioned ticket is shown. At step 1402, a user selects a fractioned ticket for withdrawal, identified by a ticket code (the "withdraw ticket"). The withdraw ticket is associated with a parent ticket. At step 1404, the ticket code identifies the parent ticket of the withdraw ticket, based on information stored in the database 22. At step 1406, the second fractioned child ticket of the parent ticket (the "leaf" ticket) is identified, based on information stored in the database 22.

At step 1408, the ticket management unit 40 determines whether the leaf ticket is listed for sale on the exchange list. If the leaf ticket is listed on the exchange list, the status of the withdraw ticket is listed as ACTIVE at step 1410. The ticket may be withdrawn according to process 700 (FIG. 9).

Figure 17:
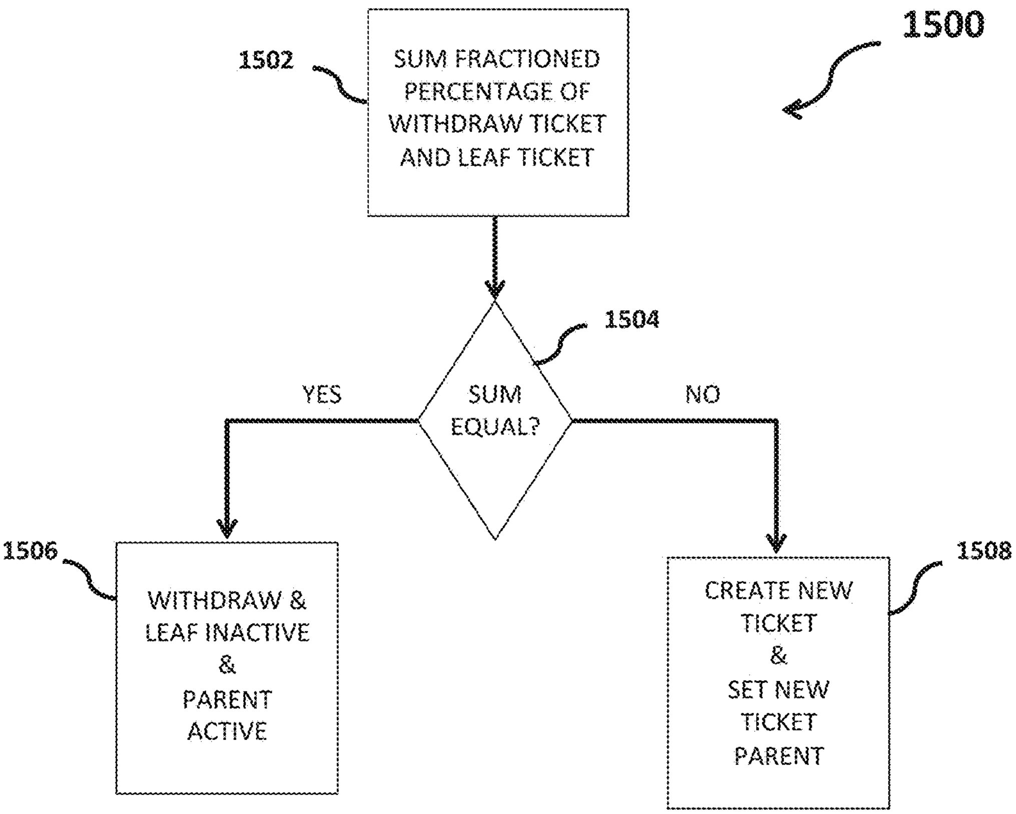
FIG. 17 is a flowchart of a second fractioned ticket withdrawal process, according to a first embodiment of the present invention.
Figure 18:
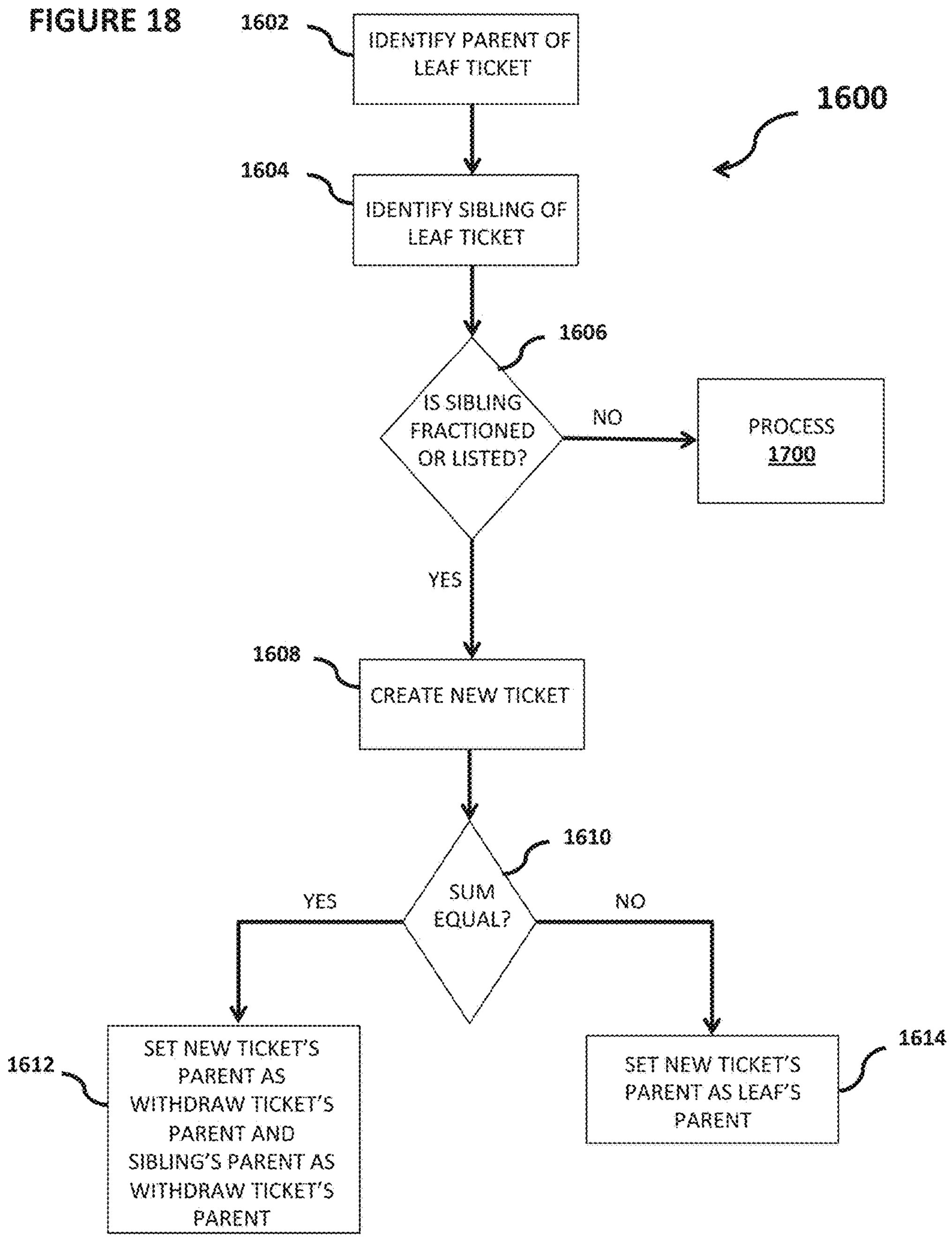
FIG. 18 is a flowchart of a third fractioned ticket withdrawal process, according to a first embodiment of the present invention.

If the leaf ticket is not listed on the exchange list, at step 1412, the ticket management unit 40 determines whether the leaf ticket's parent and withdrawing ticket have the same parent ticket. If the two parents are the same, process 1500 is followed (FIG. 17). If the two parents are not the same, process 1600 is followed (FIG. 18).

Referring now to FIG. 17, a process 1500 for withdrawing a fractioned ticket, when the leaf ticket's parent ticket and the withdraw ticket have the same parent ticket, is shown. At step 1502, the ticket management unit 40 calculates the sum of the fractioned percentage of the withdraw ticket and the leaf ticket. The sum may be updated in the database 22. At step 1504, the ticket management unit 40 determines whether the sum is equal to the parent ticket's fraction percentage.

If the sum is equal to the parent ticket's fraction percentage, at step 1506, the status of the parent ticket is set to ACTIVE and the statuses of the withdraw ticket and leaf ticket are set to INACTIVE.

If the sum is not equal to the parent ticket's fraction percentage, at step 1508, a new ticket is created with a fraction percentage equal to the sum of the withdraw ticket and the leaf ticket's percentage. The new ticket's parent is assigned as the withdraw ticket or leaf ticket's parent. The ticket may then be withdrawn according to process 700 (FIG. 9).

Referring now to FIG. 18, a process 1600 for withdrawing a fractioned ticket, when the leaf ticket's parent ticket and the withdraw ticket do not have the same parent ticket, is shown. At step 1602, the parent of the leaf ticket is identified by the ticket management unit 40. At step 1604, the ticket management unit 40 identifies another child ticket of the parent ticket ("sibling" ticket).

At step 1606, the ticket management unit 40 determines whether the sibling ticket is fractioned or listed for sale on the exchange list. If the sibling ticket is not fractioned or listed for sale, a process 1700 is followed (FIG. 19).

If the sibling ticket is fractioned or listed for sale, at step 1608 the ticket management unit 40 creates a new ticket with a fraction percentage that equals the sum of the fraction of the leaf ticket and the withdraw ticket. At step 1610, the ticket management unit 40 determines whether the sum is equal to the withdraw ticket's parent's fraction percentage.

If the sum is equal, at step 1612, the ticket management unit 40 assigns the new ticket's parent as the withdraw ticket's parent and assigns the sibling's parent as the withdraw ticket's parent. If the sum is not equal, at step 1614, the ticket management unit 40 assigns the new ticket's parent as the leaf's parent. The new assignment information may be stored in database 22. The ticket may then be withdrawn according to process 700 (FIG. 9).

Figure 19:
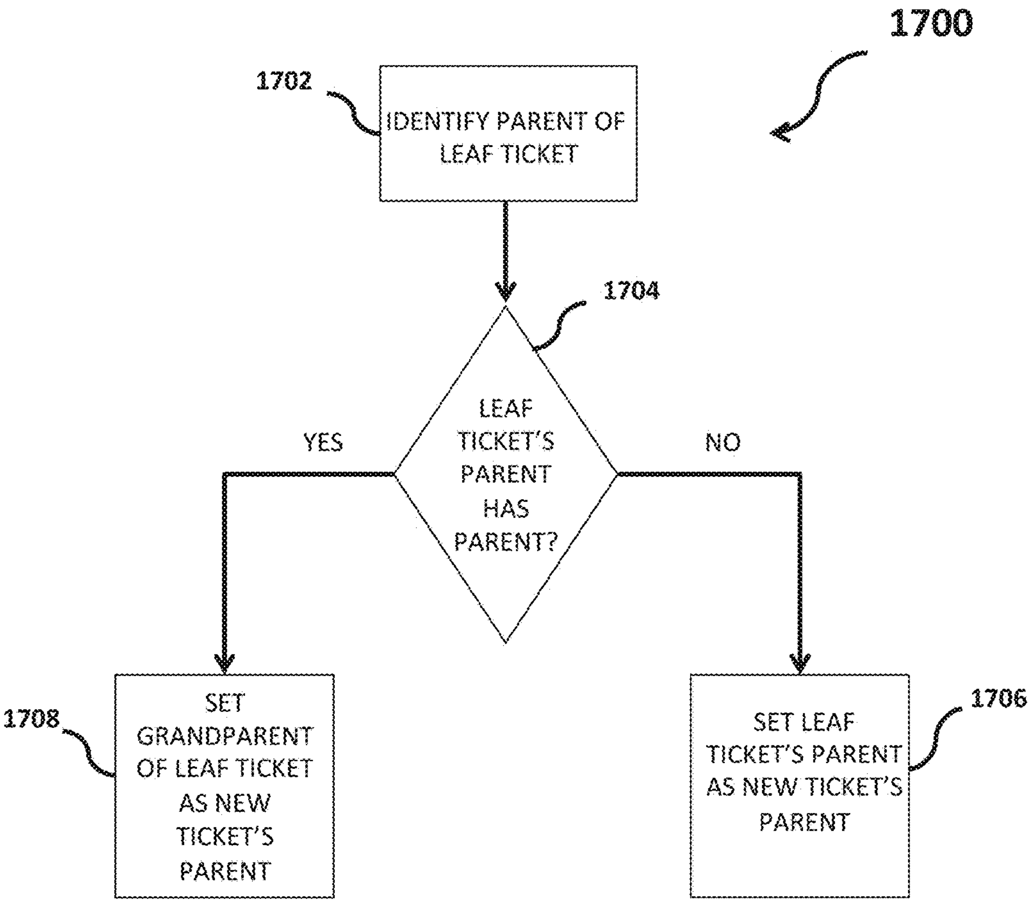
FIG. 19 is a flowchart of a fourth fractioned ticket withdrawal process, according to a first embodiment of the present invention.

Referring now to FIG. 19, a process 1700 for withdrawing a fractioned ticket, when the leaf ticket's sibling is not fractioned or listed for sale, is shown. At step 1702, the ticket code identifies the parent ticket of the leaf ticket, based on information stored in the database 22. At step 1704, the ticket management unit 40 determines whether the leaf's parent ticket has a parent. At step 1706, if the leaf parent's ticket does not have a parent, the leafs parent is assigned as the new ticket's parent. At step 1708, if the leaf parent's ticket does have a parent, then the grandparent ticket of the leaf is assigned as the new ticket's parent. The new assignment information may be stored in database 22. The ticket may then be withdrawn according to process 700 (FIG. 9).

Buying Fractioned Ticket

Figure 20:
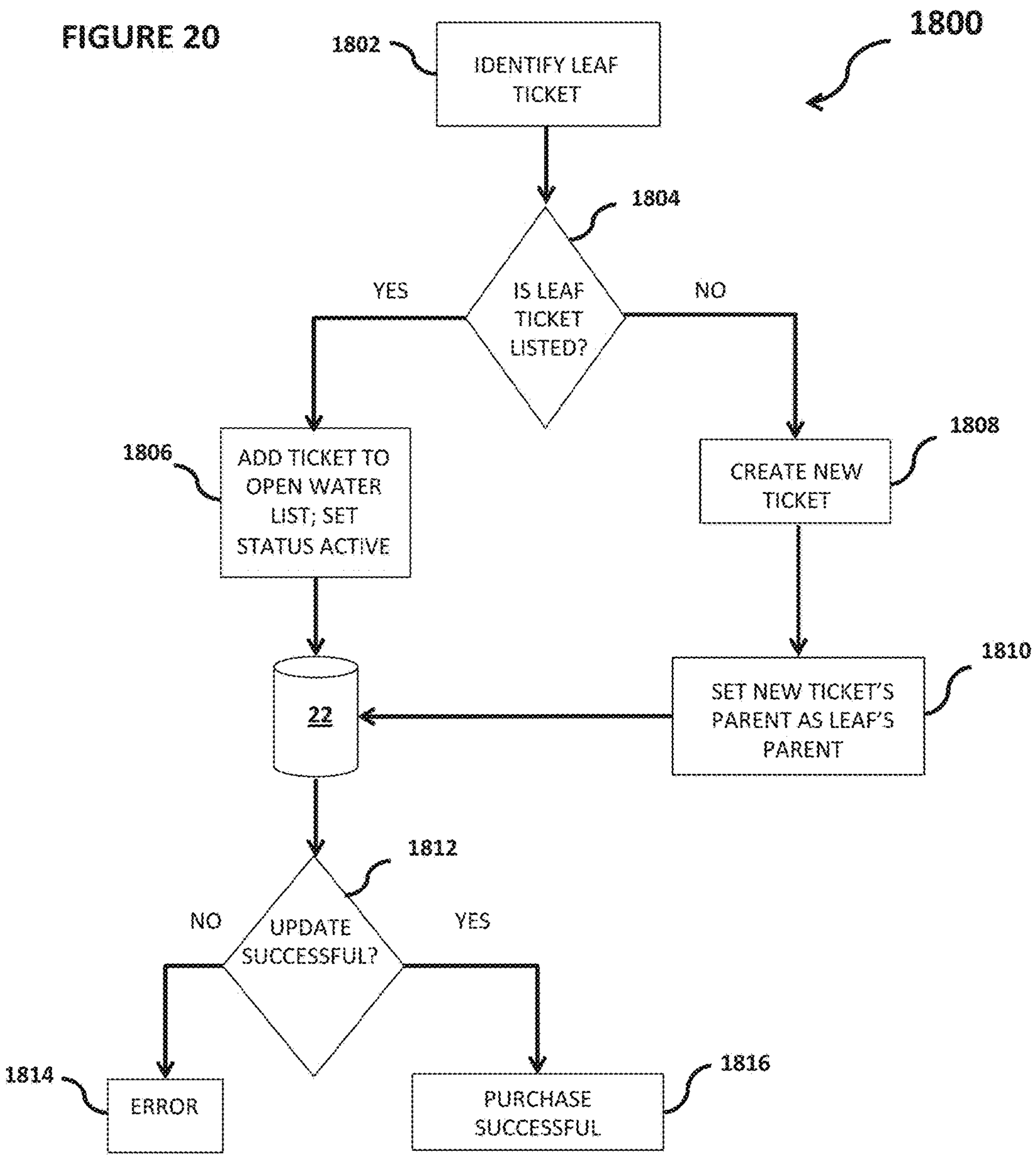
FIG. 20 is a flowchart of a fractioned ticket purchase process, according to a first embodiment of the present invention.

Referring now to FIG. 20, a process 1800 is shown for allowing a user to purchase a fractioned ticket that has a sibling in the user's open wager list. At step 1802, the ticket management unit 40 identifies the last non-fractional ACTIVE ticket with same ticket ID (a "leaf" ticket) from database 22. At step 1804, the ticket management unit 40 determines whether the leaf ticket is listed. If the leaf ticket is listed, at step 1806, the ticket is added to the user's open wager list, the ticket's status is set as ACTIVE, and the database 22 is updated.

If the leaf ticket is not listed, at step 1808, the ticket management unit 40 creates a new ticket with a fraction percentage equal to the sum of the leaf and purchased ticket percentage. At step 1810, the ticket management unit 40 assigns the new ticket's parent as the leaf ticket's parent. The new assignment information may be stored in database 22.

At step 1812, the system determines whether the update was successful. If the update was not successful, at step 1814, an error message is sent by the communications unit 32 to the user. If the update was successful, at step 1816, a message indicating the ticket purchase was successful is sent by the communications unit 32 to the user.

Quick-Bid Process

As discussed with reference to FIG. 10 above, a specific process is implemented when a user chooses to submit a bid on a firm bid ticket. A "quick-bid" process may be utilized to allow buyers and sellers to quickly come to an agreement on a reasonable price. The quick-bid process may be particularly useful in the context of horse racing multiple race wagers, where there is a short amount of time between each race.

Referring now to FIG. 21, a quick-bid process 1900 is shown. At step 1902, the user submits a first counter-offer, which may range between 60% and −1$ of the original listed firm bid price. When the seller has responded to the first counter offer, the user may Accept 1904, or Decline 1906, or provide a counter offer 1908 with a revised price ranging from first counter offer to −1$ of the original listed firm bid price.

If the user accepts, the ticket management unit 40 may process the transaction between user and the seller at step 1910, i.e., the accepted amount is debited from the user's account and credited to the seller's account. At step 1912, the ownership of the ticket may be updated in the database 22.

If the user declines, the ticket management unit 40 may update the quick-bid transaction as "declined" in database 22 at step 1914.

If the user counter-offers, the ticket management unit 40 determines whether the counter-offer is a first counter-offer 1916, a second counter-offer 1918, or a third counter-offer 1920.

If the counter-offer is the first counter-offer 1916, at step 1922, the ticket management unit 40 updates the counter-offer amount in the database 22 and triggers a 15-minute timer. If the counter-offer is the second counter-offer 1918, at step 1924, the ticket management unit 40 updates the counter-offer amount in the database 22 and triggers a 5-minute timer. In either case, if the user fails to respond within the timer window, the transaction is declined.

If the counter-offer is the third counter-offer 1920, at step 1926, the ticket management unit 40 updates the counter-offer amount in the database 22 and the seller may either accept (process transaction) or decline (decline transaction). Although a preferred embodiment is shown and described, it is envisioned that the triggered timers may be for any period of time, as determined and set by the wagering service.

EXAMPLE

Step 1—Seller lists ticket for sale on exchange list for $1,000.

Step 2—Bidder clicks on Counter Offer button and a sliding scale appears. The sliding scale will offer Bidder a range from $600 to $999 (minimum bid is 60% of ticket list price).

Step 3—Bidder uses the sliding scale to enter a first counter-offer amount of $600.

Step 4—Seller is notified of the first counter-offer (e.g., via a notification on Seller's smart phone). A 15-minute window is triggered, allowing Seller only 15 minutes to respond. Seller may: (A) Select YES to accept the offer, finalize the acceptance of the bid and initiate the transfer; (B) Select NO to decline the offer, ending the quick-bid process with Bidder; or (C) Select COUNTER-OFFER to produce a sliding scale based on Bidder's initial counter-offer (e.g., $600 to $900). If Seller does not respond within the 15-minute window, the quick-bid process will automatically terminate. In this example, Seller responds by choosing the COUNTER-OFFER option and selects $800 as the counter-offer (considered the second counter-offer in the quick-bid process).

Step 5—Seller is notified that only one additional counter-offer will be permitted.

Step 6—Bidder is notified of Seller's counter-offer. A 5-minute window is triggered, allowing Bidder only 5 minutes to respond. Bidder may: (A) Select YES to accept the offer, finalize the acceptance of the bid and initiate the transfer; (B) Select NO to decline the offer, ending the quick-bid process with Seller; or (C) Select LAST COUNTER-OFFER to produce a sliding scale based on Seller's counter-offer (e.g., $700 to $800). If Bidder does not respond within the 5-minute window, the quick-bid process will automatically terminate. In this example, Bidder responds by choosing the LAST COUNTER-OFFER option and selects $700 as the counter-offer (considered the third and final counter-offer in the quick-bid process).

Step 7—Seller is notified of Bidder's counter-offer. Seller may: A) Select YES to accept the offer, finalize the acceptance of the bid and initiate the transfer; or (B) Select NO to decline the offer, ending the quick-bid process with Bidder.

Fantasy Sports Exchange System

The above-described invention is envisioned to function in both a legal gaming context (e.g., casinos, sports books, race books, OTB locations, etc.) and in a fantasy sports context. The following includes a description of the processes that may be implemented specifically in a fantasy sports context.

Figure 22:
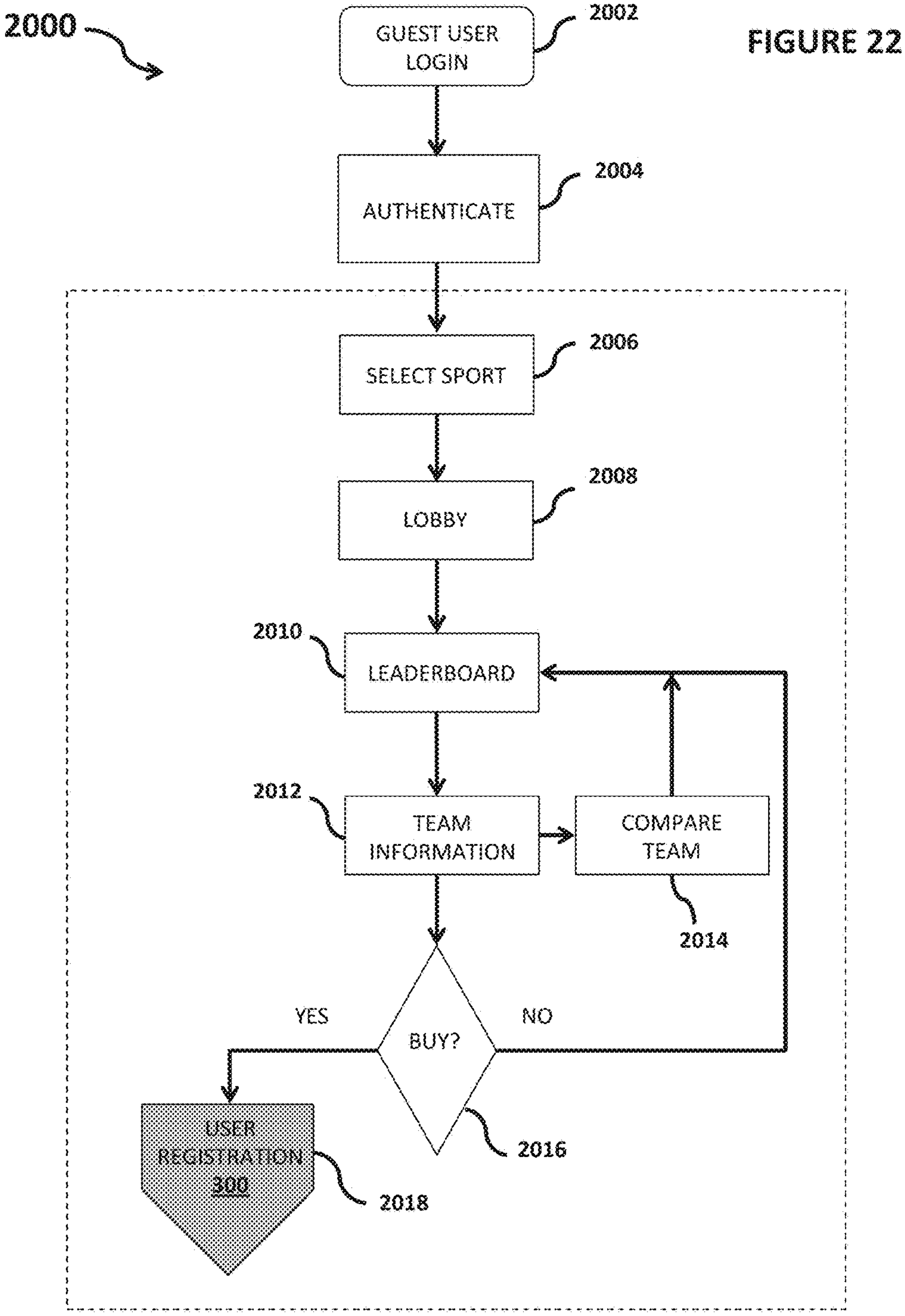
FIG. 22 is a flowchart of a guest login process, according to a second embodiment of the present invention.

Referring now to FIG. 22, a guest login process 2000 is shown. At step 2002, a guest user may access, via the communications unit 32 and the hosting unit 34, an exchange website associated with the wagering service via a guest link available on a user login screen. At step 2004, the authentication unit 36 validates the guest login credentials by retrieving information from the database 22.

At step 2006, the user may select a sport from a list of sports. At step 2008, the user may be directed to a lobby screen, where a list of tournaments for the selected sport is displayed. At step 2010, the user may choose any one tournament and view the associated leaderboard, which lists the fantasy game players in the tournament, along with the players' ranking and prize money. At step 2012, the user may choose any one from the list of players and view the team composition. At step 2014, the user may compare one or more teams.

At step 2018, the user may decide to purchase a team entry (or a fraction of the entry; see process 1300, FIG. 15). If the user decides not to purchase the entry, he may be redirected to step 2010 to view the leaderboard. If the user decides to purchase the team, he may be prompted, by the profile management unit 38, to create a user account using process 300.

Figure 23:
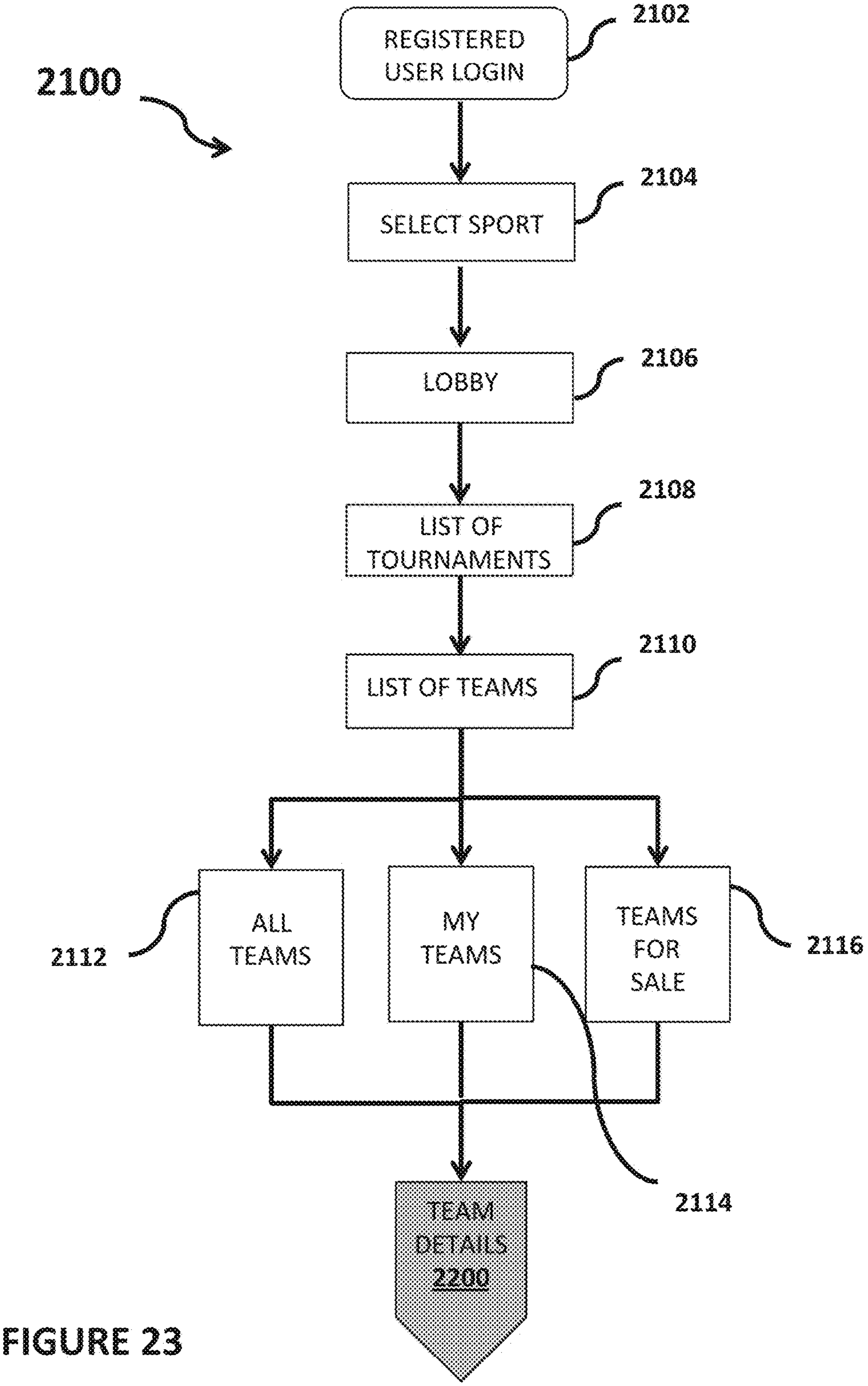
FIG. 23 is a flowchart of a view account process, according to a second embodiment of the present invention.

Referring now to FIG. 23, a process 2100 is shown that allows a user to view account information and team information upon successful login. At step 2102, the user successfully logs in to the exchange system. At step 2104, the user is prompted to select a sport from a list of sports. At step 2106, the user is directed to a lobby screen for the selected sport. At step 2108, the user views a list of tournaments for the selected sport. At step 2110, the user may choose any one tournament and view a list of teams competing in the tournament. The list of teams may be separated into groups: All teams 2112, My Teams 2114 (teams owned by the user), and Teams for Sale 2116. The user may be able to toggle between different screens or tabs to view the different groupings. The user may select a team to view its details, described by process 2200 (FIG. 24).

Figure 24:
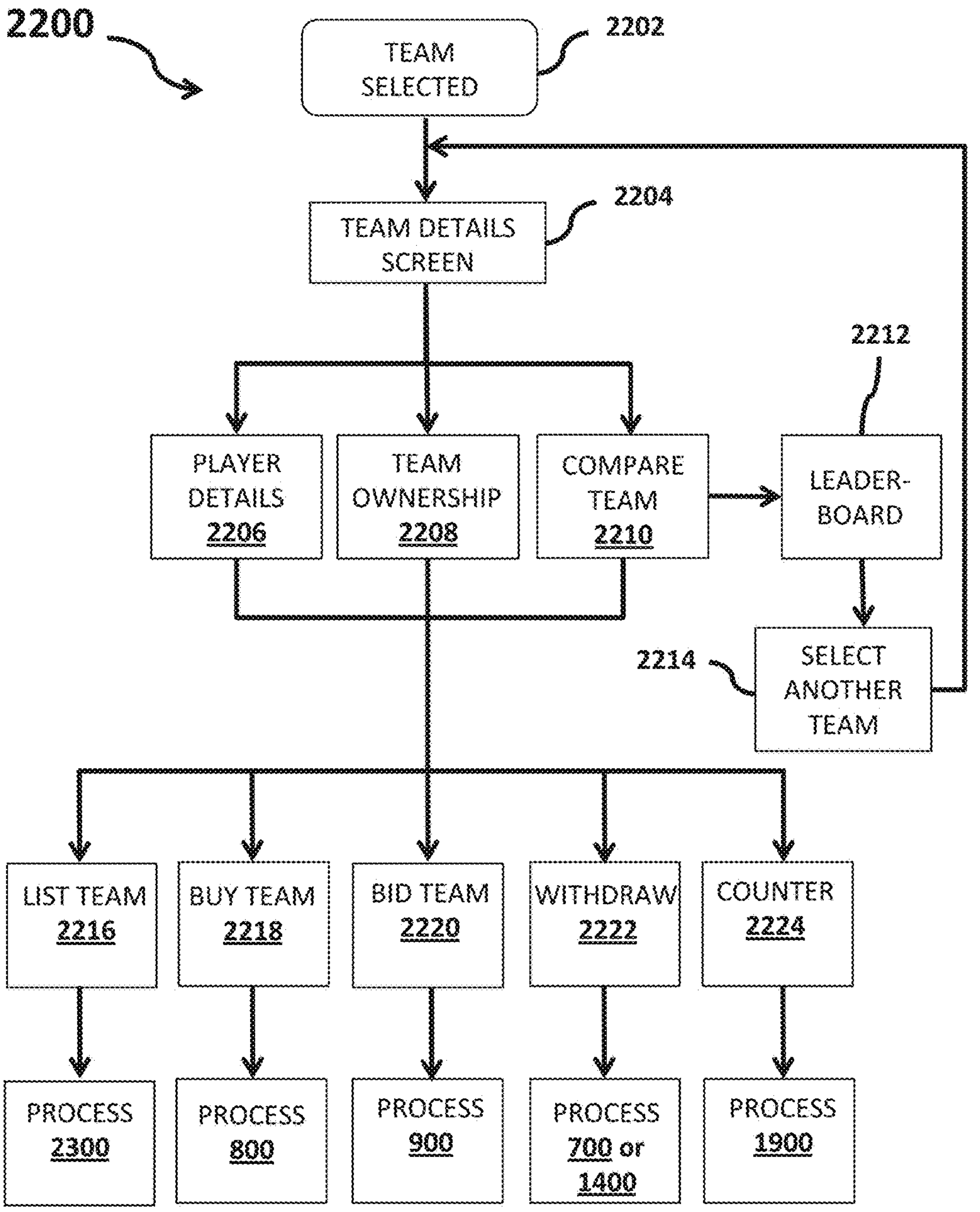
FIG. 24 is a flowchart of a view team details process, according to a second embodiment of the present invention.

Referring now to FIG. 24, a process 2200 is shown that allows a user to view details about a selected team. At step 2202, the user selects a team from the leaderboard screen. At step 2204, the user is directed to a team details screen associated with the selected team. The team details screen includes a variety of information about the selected team, which may include Player Details 2206, Team Ownership Details 2208, and a Compare Teams option 2210. At step 2212, the user may compare the selected team with any other team in the leaderboard, other than the selected team. At step 2214, the user may select the other team to view more details, at which point the user is redirected to step 2202.

Figure 25:
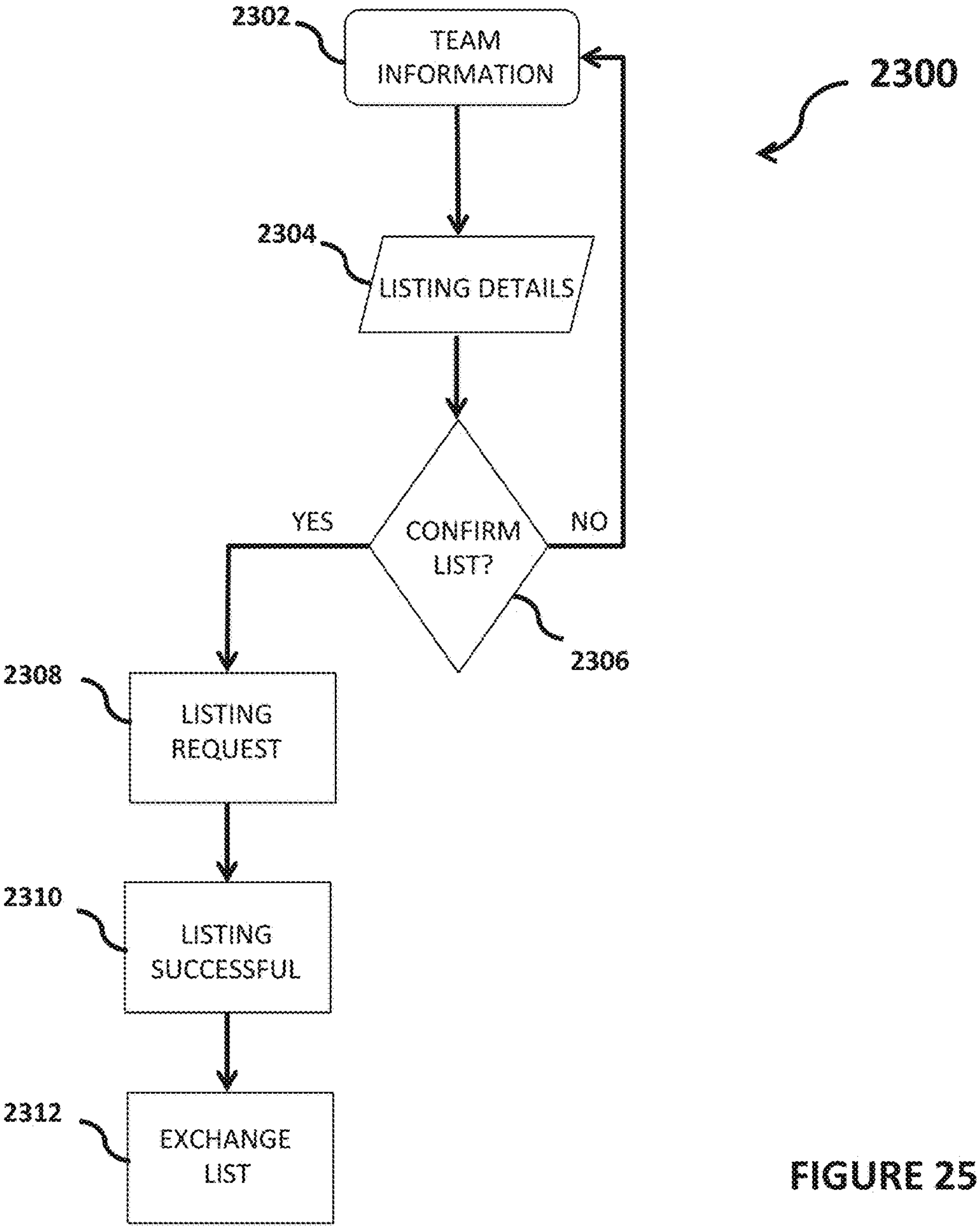
FIG. 25 is a flowchart of a list team process, according to a second embodiment of the present invention.

From the Team Ownership Details 2208 section, the user may be presented with a variety of options: List Team 2216, Buy Team 2218, Bid Team 2220, Withdraw Team 2222, and view Counter-offer 2224. If the user chooses to list a team, the user is prompted to follow list team process 2300 (FIG. 25). If the user chooses to buy a team, the user is prompted to follow firm bid process 800. If the user chooses to bid a team, the user is prompted to follow starting bid process 900. If the user chooses to withdraw a listed team, the user is prompted to follow withdraw process 700 (non-fractioned) or 1400 (fractioned). If the user chooses to view a counter-offer, the user is prompted to follow quick-bid process 1900.

Referring now to FIG. 25, a list team process 2300 is shown. At step 2302, the user begins at a team information screen. At step 2304, the user enters details about the listing of the team, including, for example, list price, bidding type, bidding timeframe, and percentage to be sold (if fractioned). At step 2306, the user is prompted to confirm that he wishes to list the team. At step 2308, if the user confirms the listing, the communications unit 32 sends a request to ticket management unit 40 to save the listing information in database 22 and add the listing to the exchange list. The listing information may include information about whether the ticket is fractioned and assigned ticket type. At step 2310, the user is notified that the listing was successful. At step 2312, the user is directed to the exchange list (see FIG. 9, process 700). If the user declines to confirm the listing of the team for sale, the user is returned to the team information screen.

Fantasy Sports Bidding Process—Example #1

Step 1—Bidder decides to buy a fraction of an entry.

Step 2—Bidder selects a tournament entry being offered for sale.

Step 3—Bidder selects an option from the exchange list: "I would like to bid on this entry".

Step 4—Bidder examines details of entry, including fraction offered for sale, type of bid requested, timeframe for bidding, current bid, etc.

Step 5—Bidder applies pricing algorithm to obtain estimate of current value of entry.

Step 6—Bidder submits first bid on entry.

Step 7—Amount of bid is removed from Bidder's account and placed in escrow.

Step 8—Bidder is outbid by a second bidder.

Step 9—Seller accepts bid by second bidder.

Step 10—Funds held in escrow immediately returned to Bidder's account.

Step 11—Bidder notified of failed bid attempt and reason (e.g., outbid).

Fantasy Sports Bidding Process—Example #2

Step 1—Bidder decides to buy a fraction of an entry.

Step 2—Bidder selects a tournament entry being offered for sale.

Step 3—Bidder selects an option from the exchange list: "I would like to bid on this entry".

Step 4—Bidder examines details of entry, including fraction offered for sale, type of bid requested, timeframe for bidding, current bid, etc.

Step 5—Bidder applies pricing algorithm to obtain estimate of current value of entry.

Step 6—Bidder submits first bid on entry.

Step 7—Amount of bid is removed from Bidder's account and placed in escrow.

Step 8—Seller accepts bid by Bidder.

Step 9—Funds held in escrow immediately transferred to Seller's account.

Step 10—Fraction ownership of entry (e.g., 20% of entry) immediately transferred to Bidder's account.

Online Race Track Bidding Process—Example #1

Step 1—Bidder decides to buy a fraction of ticket.

Step 2—Bidder selects ticket being offered for sale.

Step 3—Bidder selects option from the exchange list: "I would like to bid on this ticket".

Step 4—Bidder examines details of ticket, including fraction offered for sale, type of bid requested, timeframe for bidding, current bid, etc.

Step 5—Bidder applies pricing algorithm to obtain estimate of current value of ticket.

Step 6—Bidder submits first bid on ticket.

Step 7—Amount of bid is removed from Bidder's account and placed in escrow.

Step 8—Bidder is outbid by a second bidder.

Step 9—Seller accepts bid by second bidder.

Step 10—Funds held in escrow immediately returned to Bidder's account.

Step 11—Bidder notified of failed bid attempt and reason (e.g., outbid).

Online Race Track Bidding Process—Example #2

Step 1—Bidder decides to buy a fraction of a ticket.

Step 2—Bidder selects a ticket being offered for sale.

Step 3—Bidder selects an option from the exchange list: "I would like to bid on this ticket".

Step 4—Bidder examines details of ticket, including fraction offered for sale, type of bid requested, timeframe for bidding, current bid, etc.

Step 5—Bidder applies pricing algorithm to obtain estimate of current value of ticket.

Step 6—Bidder submits first bid on ticket.

Step 7—Amount of bid is removed from Bidder's account and placed in escrow.

Step 8—Seller accepts bid by Bidder.

Step 9—Funds held in escrow immediately transferred to Seller's account.

Step 10—Fraction ownership of ticket (e.g., 20% of ticket) immediately transferred to Bidder's account.

Bidding Notification

In any of the applications of the exchange system described herein, the user may keep track of his bids on a bidding notification screen. The bidding notification screen may include information about the user's current bids, such as current status of bids, whether the user has been outbid on any bids, etc. The user may also estimate the amount of funds needed in his user account to place a bid. The bidding notification screen may also include preferences about notifications to the user, such as, for example, notifying the user when tickets/entries are available that might be of interest to the user (e.g., by financial range or by sporting type), and notifying the user when there has been a status change in the user's current bids.

Gaming Management Unit

The gaming management unit 42 may be programmed to customize the system 10 based on preferences of the wagering service and generate reports for the wagering service based on the activity of the system 10. Preferences of the wagering service may include, by way of example and not limitation, (1) payment methods accepted for placing funds into an account and transferring funds out of an account by a user, (2) compliance standards set by the wagering service and/or by applicable law, (3) security preferences, including website security, (4) ticket tracking preferences, and (5) ticket verification preferences and methods. The gaming management unit may also run daily or monthly reports to derive information about the exchange system, such as activity reports and financial reports.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media. An apparatus may be expressed in terms of modules and/or units that include one or more discrete hardware components or portions thereof as configured by software (in any form). Furthermore, an apparatus may take the form of one or more elements expressed as a means for performing a specified function. When expressed in such a form, the means are to be interpreted as meaning the combination of hardware components or portions thereof contained within this specification, and any equivalents thereof.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:

a database stored on a server;

an exchange application associated with a wagering service and installed on a user device accessible to a user, wherein the user device includes a user interface; and a processing device of the server, wherein the processing device is in communication with the user interface, the processing device including:

a hosting unit configured to:

prompt the user to access the exchange application, prompt the user to choose a ticket from the exchange application to offer for partial sale, and receive from the user a percentage value of the ticket that the user wishes to sell, wherein the percentage value is less than one hundred percent and above a predefined percentage threshold; and a ticket management unit configured to:

split the ticket into two child tickets, a first child ticket corresponding to the percentage value the user wishes to sell and a second child ticket corresponding to a percentage value the user wishes to retain, and set a status associated with the ticket as inactive.

2. The system of claim 1, wherein the ticket management unit is further configured to offer the first child ticket for sale on the exchange website.

3. The system of claim 1, wherein the ticket management unit is further configured to set a status associated with the second child ticket as active.

4. The system of claim 2, wherein the ticket management unit is further configured to accept an offer for sale of the first child ticket from a second user.

5. The system of claim 4, wherein the second user is a customer of the wagering service.

6. The system of claim 4, wherein the second user is the wagering service.

7. The system of claim 1, wherein the predefined percentage threshold is ten percent.

8. The system of claim 1, wherein the predefined percentage threshold is five percent.

9. The system of claim 1, wherein the wagering service sets the predefined percentage threshold.

10. A computer-implemented method comprising:

prompting a user to access, by a hosting unit, an exchange website associated with a wagering service;

prompting the user, by the hosting unit, to choose a ticket from the exchange website to offer for partial sale;

receiving, from the user by the hosting unit, a percentage value of the ticket that the user wishes to sell, wherein the percentage value is less than one hundred percent and above a predefined percentage threshold;

splitting, by a ticket management unit, the ticket into two child tickets, a first child ticket corresponding to the percentage value the user wishes to sell and a second child ticket corresponding to a percentage value the user wishes to retain; and setting, by the ticket management unit, a status associated with the ticket as inactive.

11. The computer-implemented method of claim 10, further comprising:

setting, by the ticket management unit, a status associated with the first child ticket as active; and offering, by the ticket management unit, the first child ticket for sale on the exchange web site.

12. The method of claim 10, further comprising:

setting, by the ticket management unit, a status associated with the second child ticket as active.

13. The method of claim 11, further comprising:

accepting, by the ticket management unit, an offer for sale of the first child ticket from a second user.

14. The method of claim 13, wherein the second user is a customer of the wagering service.

15. The method of claim 13, wherein the second user is the wagering service.

16. The method of claim 10, wherein the predefined percentage threshold is ten percent.

17. The method of claim 10, wherein the predefined percentage threshold is five percent.

18. The method of claim 10, wherein the wagering service sets the predefined percentage threshold.

19. A non-transitory information recording medium on which a computer readable program is recorded that causes a computer to function as a system comprising:

a database stored on a server;

an exchange application associated with a wagering service and installed on a user device accessible to a user, wherein the user device includes a user interface; and a processing device of the server, wherein the processing device is in communication with the user interface, the processing device including:

a hosting unit configured to:

prompt a user to access the exchange application, prompt the user to choose a ticket from the exchange application to offer for partial sale, and receive from the user a percentage value of the ticket that the user wishes to sell, wherein the percentage value is less than one hundred percent and above a predefined percentage threshold; and a ticket management unit configured to:

split the ticket into two child tickets, a first child ticket corresponding to the percentage value the user wishes to sell and a second child ticket corresponding to a percentage value the user wishes to retain, and set a status associated with the ticket as inactive.

20. The non-transitory information recording medium of claim 19, wherein the ticket management unit is further configured to offer the first child ticket for sale on the exchange application.

21. The non-transitory information recording medium of claim 20, wherein the ticket management unit is further configured to accept an offer for sale of the first child ticket from a second user.

22. The non-transitory information recording medium of claim 21, wherein the second user is a customer of the wagering service.

23. The non-transitory information recording medium of claim 21, wherein the second user is the wagering service.

24. The non-transitory information recording medium of claim 19, wherein the predefined percentage threshold is ten percent.

25. The non-transitory information recording medium of claim 19, wherein the predefined percentage threshold is five percent.

* * * * *